United States Patent
Hayashi

(10) Patent No.: US 11,137,654 B2
(45) Date of Patent: Oct. 5, 2021

(54) DISPLAY APPARATUS

(71) Applicant: Japan Display Inc., Tokyo (JP)

(72) Inventor: Hirotaka Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/165,976

(22) Filed: Feb. 3, 2021

(65) Prior Publication Data

US 2021/0157208 A1 May 27, 2021

Related U.S. Application Data

(63) Continuation of application No. PCT/JP2019/031424, filed on Aug. 8, 2019.

(30) Foreign Application Priority Data

Aug. 30, 2018 (JP) .............................. JP2018-161637

(51) Int. Cl.
   *G02F 1/1343* (2006.01)
   *G02F 1/1362* (2006.01)
   *G02F 1/1339* (2006.01)

(52) U.S. Cl.
   CPC ...... *G02F 1/136286* (2013.01); *G02F 1/1339* (2013.01)

(58) Field of Classification Search
   CPC ................................................ G02F 1/136286
   See application file for complete search history.

(56) References Cited

U.S. PATENT DOCUMENTS

| 2006/0262253 A1 | 11/2006 | Teramoto et al. |
| 2008/0117497 A1* | 5/2008 | Shimodaira ....... G02F 1/136286 359/296 |
| 2010/0026611 A1* | 2/2010 | Igeta ................. G02F 1/136286 345/55 |

(Continued)

FOREIGN PATENT DOCUMENTS

| JP | 2003-167271 A | 6/2003 |
| JP | 2006-343728 A | 12/2006 |

(Continued)

OTHER PUBLICATIONS

International Search Report and Written Opinion dated Oct. 8, 2019, received for PCT Application PCT/JP2019/031424, Filed on Aug. 8, 2019, 9 pages including English Translation.

*Primary Examiner* — Sang V Nguyen
(74) *Attorney, Agent, or Firm* — Xsensus LLP

(57) ABSTRACT

Some of a plurality of image signal lines of a display apparatus according to one embodiment includes: a plurality of bypass wiring portions (bypass wirings) arranged in a frame region so as to have both ends being connected to a plurality of extension wiring portions (extension wirings). The plurality of bypass wiring portions of the plurality of image signal lines include: a plurality of second-layer bypass wirings arranged in a second conductive layer; and a plurality of third-layer bypass wirings arranged in a third conductive layer that is different from a first conductive layer and the second conductive layer. Each of an arrangement pitch between the plurality of second-layer bypass wirings and an arrangement pitch between the plurality of third-layer bypass wirings is smaller than an arrangement pitch between the plurality of image signal lines in a display region.

17 Claims, 16 Drawing Sheets

(56) References Cited

U.S. PATENT DOCUMENTS

2016/0202515 A1   7/2016  Watanabe et al.
2017/0123452 A1*  5/2017  Evans, V .......... G02F 1/133305
2017/0288003 A1  10/2017  Kim et al.
2017/0358612 A1* 12/2017  Evans, V ............... G02B 5/201

FOREIGN PATENT DOCUMENTS

| JP | 2008-233606 A | 10/2008 |
| JP | 2010-32760 A | 2/2010 |
| JP | 2014-153483 A | 8/2014 |
| JP | 2018-523840 A | 8/2018 |
| WO | 2015/029704 A1 | 3/2015 |

* cited by examiner

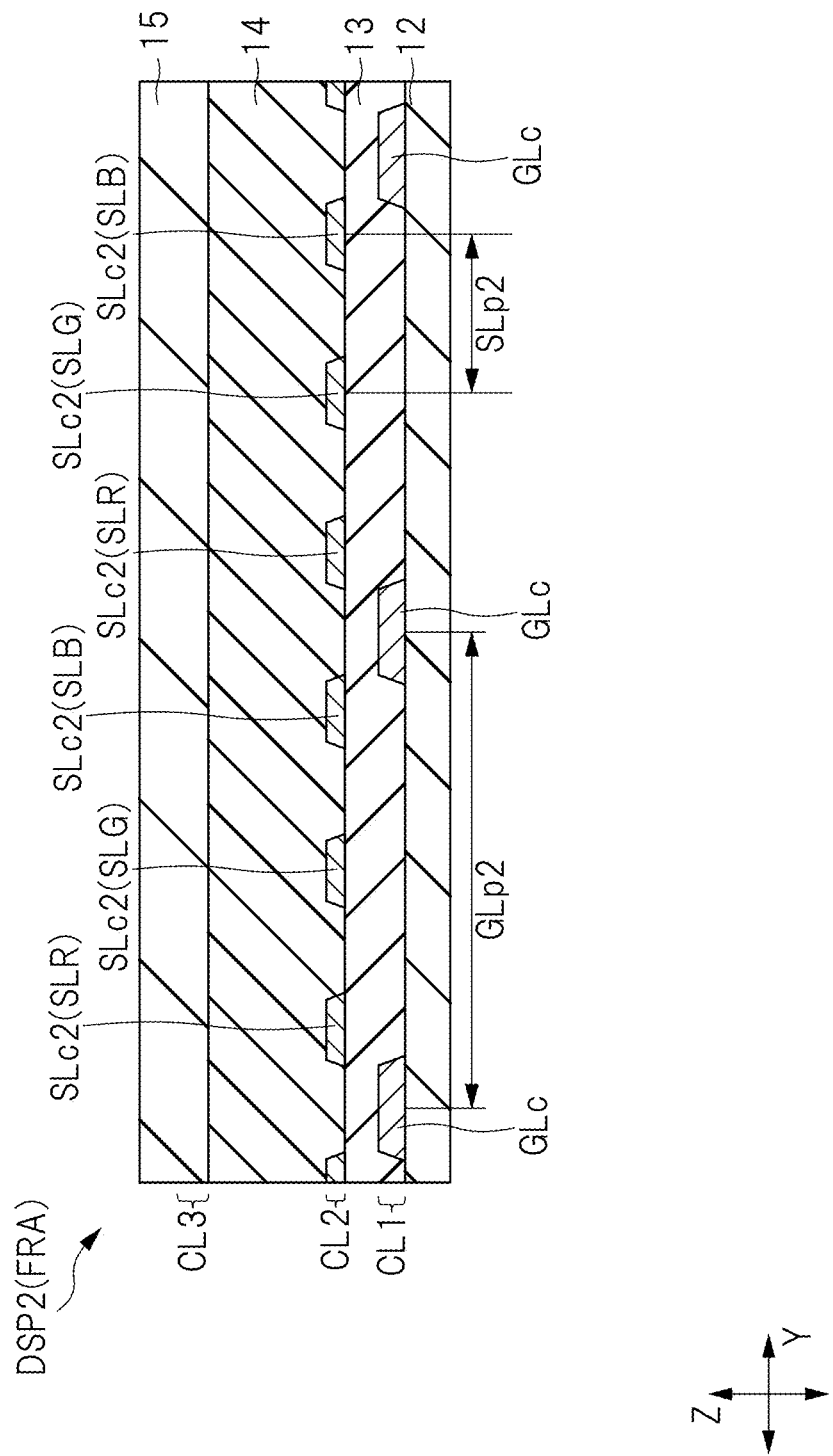

DISPLAY APPARATUS

CROSS-REFERENCE TO RELATED APPLICATIONS

The present application is a continuation of International Application No. PCT/JP2019/031424 filed on Aug. 8, 2019 and claims priority to Japanese Patent Application No. 2018-161637 filed on Aug. 30, 2018, the disclosure of which is incorporated herein by reference.

TECHNICAL FIELD

The present invention relates to a technique of a display apparatus, and relates to a technique effectively applied to a display apparatus having a non-display region not overlapping a pixel in a display region.

BACKGROUND ART

Patent Document 1 (Japanese Patent Application Laid-Open Publication No. 2006-343728) describes a display apparatus having a light-blocking unit that is arranged between an image display unit and a transparent display unit. Patent Document 2 (U.S. Patent Application Laid-Open Publication No. 2017/0123452) describes a display apparatus having a transparent region that is arranged at a position overlapping a camera.

RELATED ART DOCUMENTS

Patent Documents

Patent Document 1: Japanese Patent Application Laid-Open Publication No. 2006-343728
Patent Document 2: U.S. Patent Application Laid-Open Publication No. 2017/0123452

SUMMARY OF THE INVENTION

Problems to be Solved by the Invention

In display apparatuses, there is a demand for increase in occupancy of an effective display region by reducing an area of a non-display region inside a display region as small as possible. As part of working for achieving this demand, the inventor of the present application has studied a technique for, for example, increasing an area of a display region reaching a position surrounding a region of arrangement of a component such as a camera. In a planar view, when the region of the arrangement of the component such as the camera exists inside the display region, a layout of a lot of signal wirings that are arranged in the display region becomes an issue. For example, when a visible-light transmittable transparent region is arranged inside the display region, it is necessary to form the layout of the plurality of signal wirings to bypass the transparent region so as not to overlap the transparent region.

A purpose of the present invention is to provide a technique capable of improving a performance of a display apparatus.

Means for Solving the Problems

A display apparatus according to one aspect of the present invention includes: a first substrate having a display region, a transparent region formed inside the display region in a planar view, and a frame region formed between the display region and the transparent region so as to surround the transparent region along an outer edge of the transparent region in a planar view; a plurality of scan signal lines formed in a first conductive layer on the first substrate in the display region so as to extend in a first direction; and a plurality of image signal lines formed in a second conductive layer on the first substrate in the display region so as to extend in a second direction crossing the first direction. Some of the plurality of image signal lines include: a plurality of extension wiring portions arranged in the display region so as to extend in the second direction; and a plurality of bypass wiring portions arranged in the frame region so as to have both ends being connected to the plurality of extension wiring portions. The plurality of bypass wiring portions of the plurality of image signal lines include: a plurality of second-layer bypass wiring portions arranged in the second conductive layer; and a plurality of third-layer bypass wiring portions arranged in a third conductive layer that is different from the first conductive layer and the second conductive layer. Each of an arrangement pitch between the plurality of second-layer bypass wiring portions and an arrangement pitch between the plurality of third-layer bypass wiring portions is smaller than an arrangement pitch between the plurality of image signal lines in the display region.

A display apparatus according to another aspect of the present invention includes: a display region; a transparent region formed inside the display region in a planar view; a frame region formed between the display region and the transparent region so as to surround the transparent region along an outer edge of the transparent region in a planar view; a first substrate having the display region and the frame region; a plurality of scan signal lines formed in a first conductive layer on the first substrate in the display region so as to extend in a first direction; and a plurality of image signal lines formed in a second conductive layer on the first substrate in the display region so as to extend in a second direction crossing the first direction. Some of the plurality of image signal lines includes: a plurality of first extension wirings arranged in the display region so as to extend in the first direction; and a plurality of first bypass wirings arranged in the frame region so as to have both ends being connected to the plurality of first extension wirings. Some of the plurality of image signal lines includes: a plurality of second extension wiring portions arranged in the display region so as to extend in the second direction; and a plurality of second bypass wiring portions arranged in the frame region so as to have both ends being connected to the plurality of second extension wiring portions. An arrangement pitch between the plurality of first bypass wiring portions is larger than an arrangement pitch between the plurality of first extension wiring portions. An arrangement pitch between the plurality of second bypass wiring portions is smaller than an arrangement pitch between the plurality of second extension wiring portions. The frame region includes: a first region which is arranged adjacent to the transparent region in the first direction and where one part of each of the plurality of second bypass wiring portions is arranged; a second region which is opposite to the first region across the transparent region in the first direction and where the other part of each of the plurality of second bypass wiring portions is arranged; a third region which is arranged adjacent to the transparent region in the second direction and where one part of each of the plurality of first bypass wiring portions is arranged; and a fourth region which is opposite to the third region across the transparent region in the second direction and where the other part of each of the plurality of first bypass wiring portions is arranged.

BRIEF DESCRIPTIONS OF THE DRAWINGS

FIG. 21 is an enlarged cross-sectional view showing a modification example of FIG. 12.

BEST MODE FOR CARRYING OUT THE INVENTION

Figure 1:
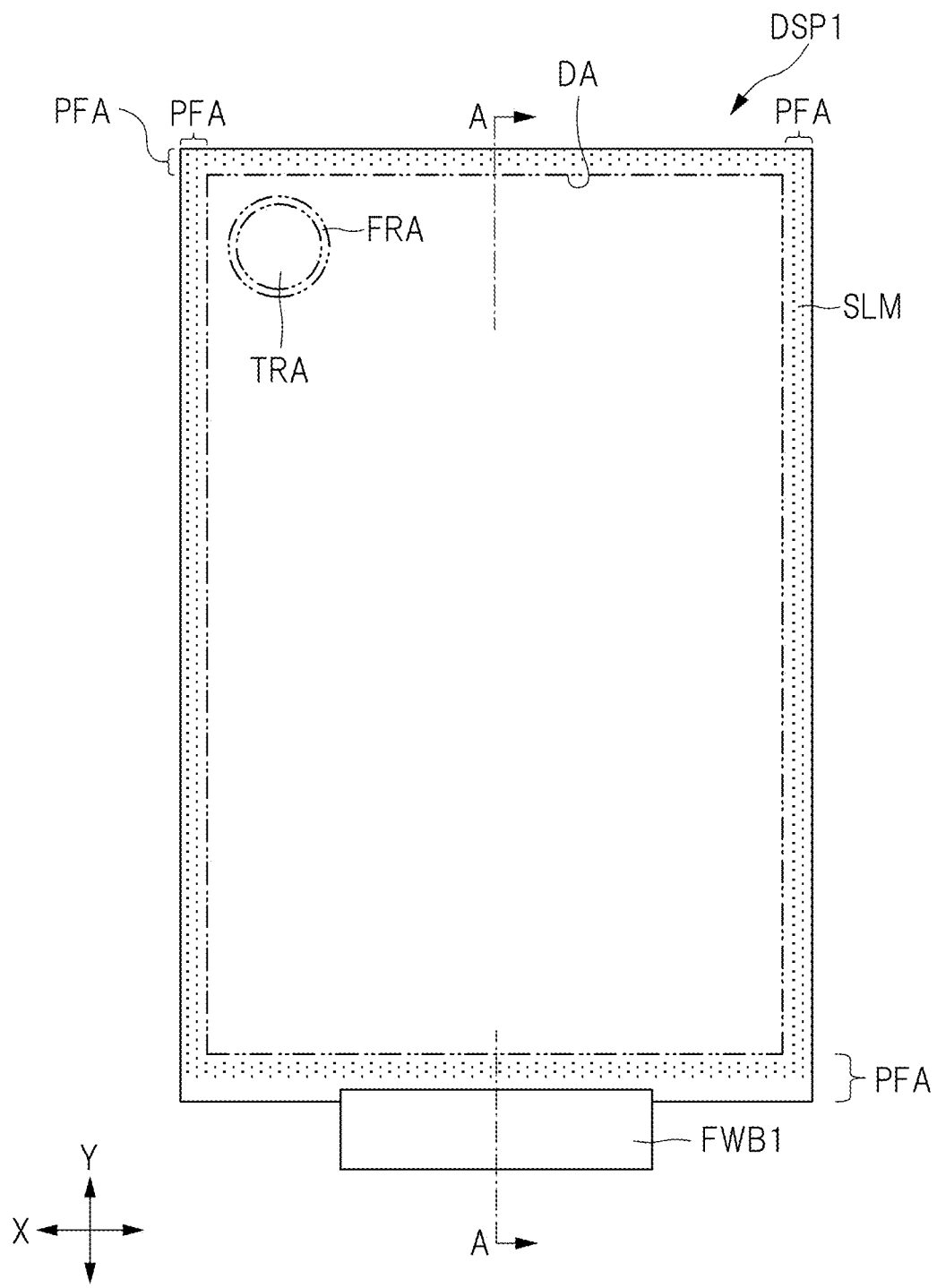
FIG. 1 is a plan view of a region of a display surface showing one example of a display apparatus according to one embodiment.

Hereinafter, each embodiment of the present invention will be described with reference to the accompanying drawings. Note that only one example is disclosed, and appropriate modification with keeping the concept of the present invention which can be easily anticipated by those who are skilled in the art is obviously within the scope of the present invention. Also, in order to make the clear description, a width, a thickness, a shape, and others of each portion in the drawings are schematically illustrated more than those in an actual aspect in some cases. However, the illustration is only an example, and does not limit the interpretation of the present invention. In the present specification and each drawing, similar elements to those described earlier for the already-described drawings are denoted with the same or similar reference characters, and detailed description for them is appropriately omitted in some cases.

In the following embodiments, a liquid crystal display apparatus having a liquid crystal layer that is an electrooptic layer will been exemplified as the display apparatus for explanation. However, the following techniques explained are applicable to not only the liquid crystal display apparatus but also various modification examples. For example, the electrooptic layer may be a layer including an element having an optical property that is changeable when being applied with electrical energy, such as not only a liquid crystal layer but also an organic luminous element layer, an inorganic luminous element layer including a micro LED, a MEMS (Micro Electro Mechanical Systems) shutter, an electrophoretic element layer or others.

In the present application, terms such as a wiring width, an arrangement pitch, a wiring density and others are used for a plurality of wirings (scan signal lines and image signal lines described later) that are arranged so as to be adjacent to each other in a planar view. The above-described terms are defined as follows. The wiring width is a length of the wiring in a direction that is orthogonal to an extension direction (longitudinal direction) of the wiring. The arrangement pitch is a center-to-center distance between the wirings that are adjacent to each other. The wiring density is an occupancy ratio of a conductive pattern configuring the wiring per unit area. The wiring density is defined by a relation between the wiring width and the arrangement pitch (the center-to-center distance). In other words, when the wiring width has a constant value, the wiring density is in inverse proportion to the arrangement pitch. When the arrangement pitch has a constant value, the wiring density is in proportion to the wiring width. A separate distance between the wirings is a distance between the adjacent wirings. Note that each of the plurality of wirings has a trapezoidal cross-sectional shape as a cross section in the width direction. In this case, the separate distance between the adjacent wirings means a distance between base sides of the trapezoids of the respective adjacent wirings. The wiring width means a length of the base side of the trapezoid of the wiring. In the present specification, a term of "line and space" is used often. A line of the "line and space" means the wiring width, and a space of the same means the separate distance.

The liquid crystal display apparatuses are roughly classified into the following two types depending on an application direction of an electric field for use in changing alignments of liquid crystal molecules of a liquid crystal layer. That is, a first type is so-called vertical electric field mode that applies the electric field in a thickness direction (or an out-of-plane direction) of the display apparatus. The vertical electric field mode includes, for example, a TN (Twisted Nematic) mode, a VA (Vertical Alignment) mode and others. A second type is so-called horizontal electric field mode that applies the electric field in a planar direction (or an in-plane direction) of the display apparatus. The horizontal electric field mode includes, for example, an IPS (In-Plane Switching) mode, a FFS (Fringe Field Switching) mode that is one of the IPS modes and others. The following techniques explained is applicable to both the vertical electric field mode and the horizontal electric field mode. However, in embodiments explained below, the display apparatus of the horizontal electric field mode will be exemplified for explanation.

First Embodiment

<Configuration of Display Apparatus>

Figure 2:
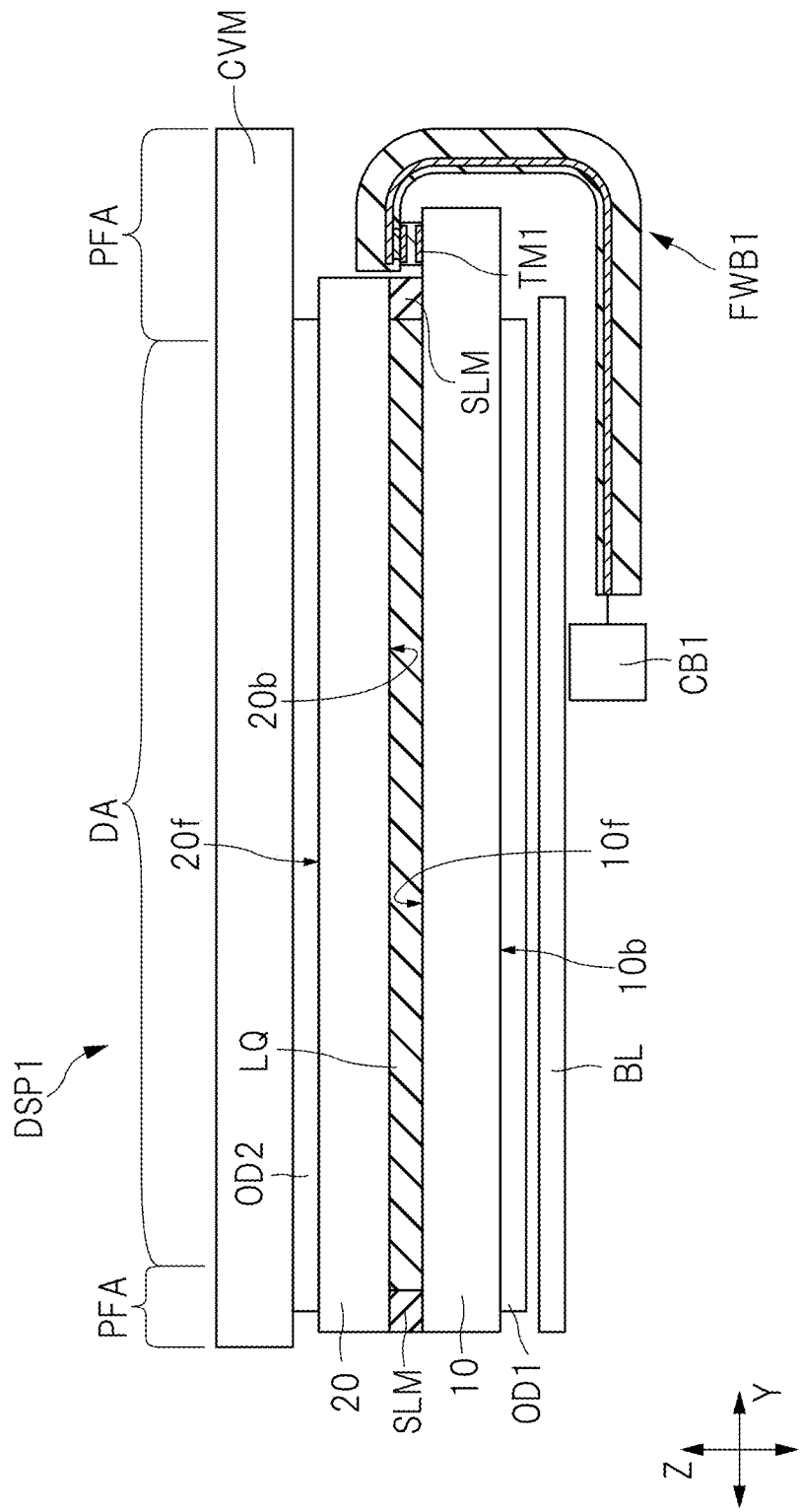
FIG. 2 is a cross-sectional view taken along a line A-A of FIG. 1.
Figure 3:
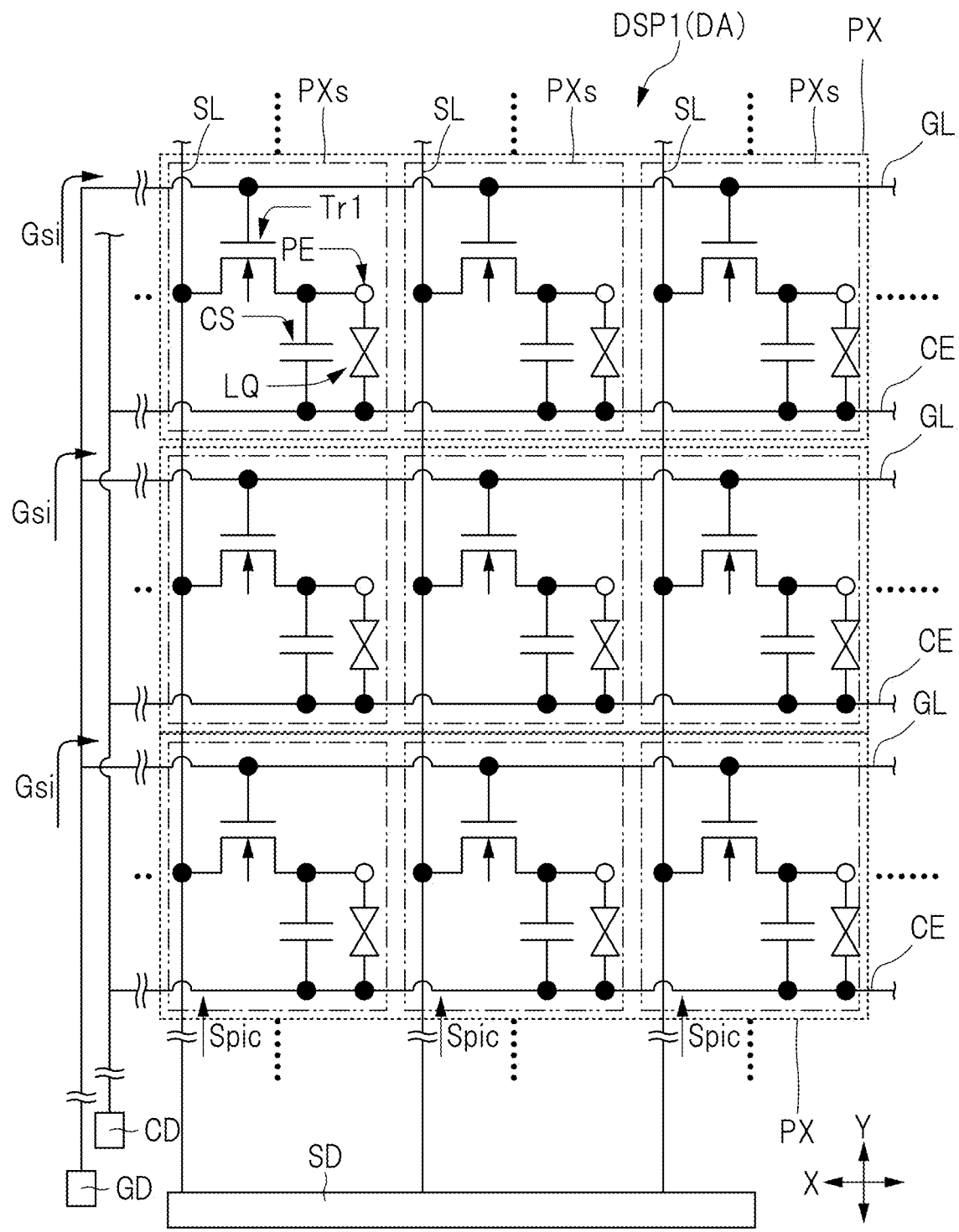
FIG. 3 is a circuit diagram showing a circuit configuration example in periphery of a pixel included in the display apparatus shown in FIG. 1.
Figure 4:
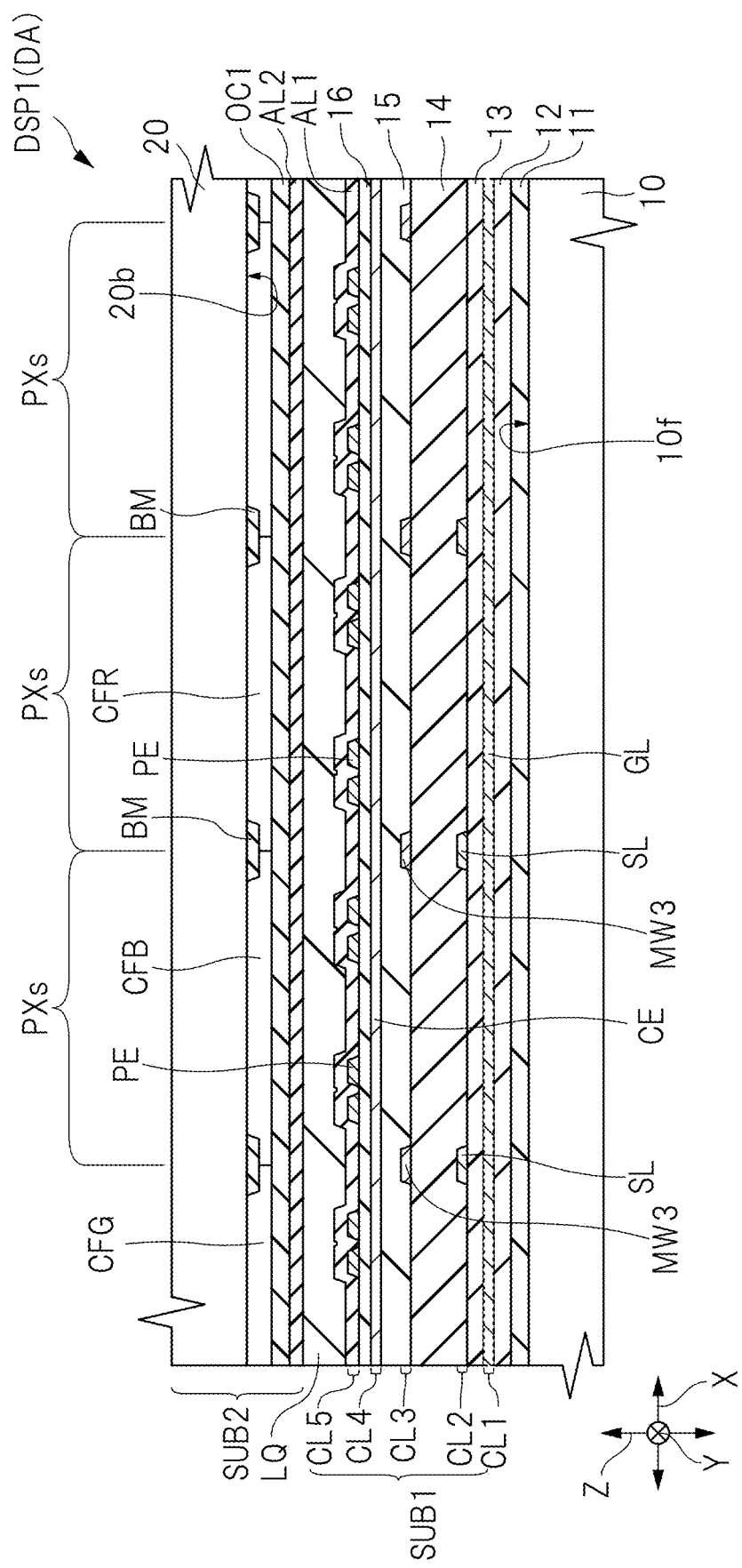
FIG. 4 is an enlarged cross-sectional view of a display region of the display apparatus shown in FIG. 2.

First, a configuration of the display apparatus will be explained. FIG. 1 is a planar view of a region of a display surface as one example of the display apparatus of the present embodiment. In FIG. 1, each of a boundary between the display region DA and the peripheral region PFA, a boundary between the display region DA and the frame region FRA and a boundary between the frame region FRA and the transparent region IRA is illustrated with a dashed double-dotted line. In FIG. 1, a region where a sealing member SLM is arranged is illustrated with a dot pattern. FIG. 2 is a cross-sectional view taken along a line A-A of FIG. 1. Although a plurality of conductive layers and insulating layers in addition to the liquid crystal layer LQ exist between a substrate 10 and a substrate 20 as shown in FIG. 4 described later, illustration of these layers is omitted in FIG. 2. FIG. 3 is a circuit diagram showing an example of a circuit configuration in periphery of a pixel included in the display apparatus shown in FIG. 1. FIG. 4 is an enlarged cross-sectional view of the display region of the display apparatus shown in FIG. 2. In FIG. 4, in order to show an example of positional relation between a scan signal line GL and an image signal line SL in a thickness direction of the substrate 10 (a "Z" direction shown in FIG. 4), the scan signal line GL that is arranged on a different cross section from that of FIG. 4 is illustrated with a dotted line.

As shown in FIG. 1, the display apparatus DSP1 of the present embodiment includes the display region DA. In the display region DA, an image is formed in accordance with an input signal that is supplied from outside. The display region DA is an effective region where the display apparatus DSP1 displays the image in a planar view in which the display surface is viewed. The display apparatus DSP1 includes the peripheral region (non-display region) PFA in periphery of the display region DA in a planar view. While the display apparatus DSP1 includes the peripheral region PFA In periphery of the display region DA, a display apparatus including a display region DA reaching an edge is also exemplified as a modification example. The techniques described below are also applicable to the display apparatus of such a type including the display region DA reaching the edge of the display apparatus. While the display region DA of the display apparatus DSP1 shown in FIG. 1 is rectangular, the display region may be not rectangular but polygonal or circular. For example, each of four corners of the display region DA is rounded in some cases.

The display region DSP1 also includes the transparent region TRA and the frame region FRA inside the display region DA in a planar view. The frame region FRA surrounds the transparent region TRA along an outer edge of the transparent region TRA in a planar view, and is between the display region DA and the transparent region TRA. The frame region FRA is shielded from the light by a light-blocking film BM described later, and the frame region FRA is also referred to as a "light-blocking region". The transparent region TRA is a region where a component such as a camera attached to the display apparatus DSP1 is arranged. The transparent region TRA is formed so as to transmit visible light in order to emit the visible light to the component such as the camera. In a substrate and a polarizer configuring the display apparatus, for example, an opening is formed in the transparent region TRA. Alternatively, in the transparent region TRA, a visible-light transmittable member is arranged but a light-blocking member such as a metal wiring is not arranged. In the transparent region TRA and the frame region FRA, note that components such as a microphone and a speaker may be arranged in addition to the camera.

As shown in FIG. 2, the display apparatus DSP1 includes the substrate 10 and the substrate 20 that are bonded to each other through the liquid crystal layer LQ so as to face each other. The substrate 10 and the substrate 20 face each other in the thickness direction (Z direction) of the display apparatus DSP1. The substrate 10 has a front surface (main surface, plane) 10f that faces the liquid crystal layer LQ (and the substrate 20). And, the substrate 20 has a back surface (main surface, plane) 20b that faces the front surface 10f of the substrate 10 (and the liquid crystal layer LQ). The substrate 10 is an array substrate in which a plurality of transistors (transistor elements) Tr1 (see FIG. 3) functioning as switching elements (active elements) are arranged in an array form. The substrate 20 is a substrate that is formed in a region closer to the display surface. The substrate 20 can be also referred to as an opposed substrate meaning a substrate that is arranged to face the array substrate.

The liquid crystal layer LQ is between the front surface 10f of the substrate 10 and the back surface 20b of the substrate 20. The liquid crystal layer LQ is an electrooptic layer that controls a state of transmittance of the visible light. This has a function of modulating light that travels through itself by controlling a state of an electric field that is formed around the liquid crystal layer LQ through the switching element. The display region DA included in the substrate 10 and the substrate 20 overlaps the liquid crystal layer LQ as shown in FIG. 2.

The substrate 10 and the substrate 20 are bonded to each other through a sealing member (adhesive member) SLM. As shown in FIG. 1, the sealing member SLM is arranged in the peripheral region PFA so as to surround the display region DA. As shown in FIG. 2, the liquid crystal layer LQ is inside the sealing member SLM. The sealing member SLM plays a role of a sticker for sealing the liquid crystal between the substrate 10 and the substrate 20. Besides, the sealing member SLM plays a role of an adhesive member for adhering the substrate 10 and the substrate 20.

The display apparatus DSP1 includes an optical device OD1 and an optical device OD2. The optical device OD1 is arranged between the substrate 10 and a backlight unit BL. The optical device OD2 is arranged in a region closer to the display surface of the substrate 20, in other words, is opposite to the substrate 10 across the substrate 20. Each of the optical device OD1 and the optical device OD2 includes at least a polarizer, and may include a waveplate if needed. As described above, in the transparent region TRA, the optical devices OD1 and OD2 that can be obstructive factors for transparency are not formed. More specifically, an opening is formed in the optical devices OD1 and OD2 so as to extend along a shape of the transparent region TRA.

The display apparatus DSP1 includes a cover member CVM (see FIG. 2) that covers the region closer to the display surface of the substrate 20. The cover member CVM faces the front surface (plane) 10f opposite to the back surface (plane) 20b of the substrate 20. In other words, the cover member CVM faces the front surface (plane) 20f opposite to the back surface (plane) 20b of the substrate 20. The substrate 20 is between the cover member CVM and the substrate 10 in the Z direction. The cover member CVM is a protective member that protects the substrates 10 and 20 and the optical device OD2, and is arranged in the region closer to the display surface of the display apparatus DSP1. However, as a modification example of the present embodiment, a case without the cover member CVM is exemplified in some cases.

Each of the substrate 10 and the substrate 20 is a transparent plate having visible-light transmittable property (that is characteristics for allowing the visible light to penetrate). As the substrate that is the transparent plate, a glass substrate can be exemplified. As a constituent material of each of the substrate 10 and the substrate 20, a resin material (visible-light transmittable resin material) containing a polymer such as polyimide, polyamide, polycarbonate, polyester or others can be also used. In the case of the substrate made of the resin material such as polyimide, the substrate has flexibility. When the substrate 10 has flexibility, a part (such as the peripheral region PFA) of the substrate 10 can be curved or bent. When the substrate 10 and the substrate 20 have flexibility, an area of the peripheral region PFA in a planar view can be reduced. In this case, an occupancy of an effective display region in a planar view can be increased.

As shown in FIG. 3, a plurality of pixels PX are arranged in the display region DA. In the example shown in FIG. 3, each of the plurality of pixels PX has a plurality of subpixels PXs. The plurality of subpixels PXs include subpixels PXs for, for example, red, blue and green. By control for a color tone of the plurality of subpixels PXs, a color image can be displayed. The number of types of the subpixels PXs configuring one pixel PX is not only three exemplified in FIG. 3, and various modification examples are applicable.

Each of the plurality of subpixels PXs includes a transistor Tr1 that is a switching element for controlling the turning ON/OFF of the electric field applied on the liquid crystal layer LQ. The transistor Tr1 controls an operation of the subpixel PXs. As described later, the transistor Tr1 is a thin film transistor (TFT) that is formed on the substrate 10.

As shown in FIG. 3, the display apparatus DSP1 includes a plurality of scan signal lines GL extending in an X direction in the display region DA and a plurality of image signal lines SL extending in a Y direction that crosses (in FIG. 3, that is orthogonal to) the X direction in the display region DA. The scan signal line GL is a gate line that is connected to a gate of the transistor Tr1. The image signal line SL is a source line that is connected to a source of the transistor Tr1. Each of the plurality of scan signal lines GL extends in the X direction, and is arrayed with, for example, an equal interval therebetween in the Y direction. Each of the plurality of image signal lines SL extends in the Y direction, and is arrayed with, for example, an equal interval therebetween in the X direction.

Each of the plurality of scan signal lines GL is connected to a scan driving circuit (gate driving circuit) GD. A scan signal Gsi that is output from the scan driving circuit GD is input to the gate of the transistor Tr1 through the scan signal line GL. Each of the plurality of image signal lines SL is connected to an image-signal driving circuit SD. An image signal Spic that is output from the image-signal driving circuit SD is input to the source of the transistor Tr1 through the image signal line SL.

Each of the plurality of image signal lines SL is connected to a pixel electrode PE through the transistor Tr1. More specifically, the image signal line SL is connected to the source of the transistor Tr1, and the pixel electrode PE is connected to a drain of the transistor Tr1. When the transistor Tr1 is being turned ON, the image signal Spic is supplied from the image signal line SL to the pixel electrode PE. The pixel electrode PE is connected to a common electrode CE through a dielectric layer (a capacitance element CS shown in FIG. 3). To the common electrode CE, a fixed potential is supplied from a common-potential supplying circuit CD. The fixed potential that is supplied to the common electrode CE is a common potential among the plurality of subpixels PXs. In a display period, the electric field is formed in each subpixel PXs in accordance with a potential difference between the potential that is supplied to the common electrode CE and the potential that is supplied to the pixel electrode PE, and liquid crystal molecules contained in the liquid crystal layer LQ are driven by this electric field.

Each of the scan driving circuit GD, the image-signal driving circuit SD and the common-potential supplying circuit CD shown in FIG. 3 may be a circuit that is mounted on a driver IC chip (CB1) that is formed in the peripheral region PFA shown in FIG. 1 or formed in a wiring substrate FWB1 connected to the peripheral region PFA, or may be formed as an internal circuit in the substrate 10. Although not described in detail, the wiring substrate FWB1 is connected to a plurality of terminals TM1 that are formed in the substrate 10.

As shown in FIG. 4, a plurality of conductive layers CL1 to CL5, a plurality of insulating films 11 to 16 and an alignment film AL1 are formed between the substrate 10 and the liquid crystal layer LQ. The plurality of conductive layers CL1 to CL5, the plurality of insulating films 11 to 16 and the alignment film AL1 are formed on the front surface 10f of the substrate 10. A light-blocking film BM, color filters CFR, CFG and CFB, an insulating film OC1 and an alignment film AL2 are formed between the substrate 20 and the liquid crystal layer LQ. The light-blocking film BM, the color filters CFR, CFG and CFB, the insulating film OC1 and the alignment film AL2 are formed on the back surface 20b of the substrate 20.

In each of the conductive layers C11, CL2 and CL3 shown in FIG. 4, a metallic conductor pattern (metallic wiring) is formed. Each of the conductive layer CL1 and the conductive layer CL3 includes a metallic film made of, for example, a metal such as molybdenum (Mo) or tungsten (W) or an alloy of such a metal. The conductor pattern of the conductive layer CL2 includes a metallic film having, for example, a multilayer structure such as a layered film made of an aluminum (Al) film sandwiched by a titanium (Ti) film, a titanium nitride (TiN) film or others. Each of the conductive layer CL4 and the conductive layer CL5 mainly includes a conductive oxide material (transparent conductive material) such as ITO (Indium Tin Oxide), IZO (Indium Zinc Oxide) or others.

An insulating film intervenes between the conductive layers CL1 to CL5, respectively. An insulating film 11 and an insulating film 12 intervenes between the conductive layer CL1 and the substrate 10. An insulating film 13 intervenes between the conductive layer CL1 and the conductive layer CL2. An insulating film 14 intervenes between the conductive layer CL3 and the conductive layer CL4. An insulating film 15 intervenes between the conductive layer CL4 and the conductive layer CL5. The alignment film AL1 intervenes between the conductive layer CL5 and the liquid crystal layer LQ. Each of the insulating films 11, 12, 13 and 16 is an inorganic insulating film. As the inorganic insulating film, for example, a silicon nitride (SiN) film, a silicon oxide (SiO) film, an aluminum oxide (AlOx) film or a layered film made of such films can be exemplified. Each of the insulating film 14 and the insulating film 15 is an organic insulating film. When an insulating film made of an organic material is formed to be thicker than an insulating film made of an inorganic material, an upper surface (front surface) can be planarized. Each of the insulating film 14 and the insulating film 15 is used as a planarizing film for planarizing surface unevenness of the conductor pattern formed in a lower layer. Therefore, a thickness of each of the insulating film 14 and the insulating film 15 is larger than that of each of the insulating films 11, 12 and 13 that are the inorganic insulating films. As an example of the organic insulating films, an acrylic-based light-sensitive resin or others can be exemplified.

Each of the plurality of scan signal lines GL is formed in the conductive layer CL1 above the substrate 10. The insulating film 11 and the insulating film 12 are layered on the substrate 10, and the scan signal line GL is formed on the insulating film 12. Each of the plurality of image signal lines SL is formed in the conductive layer CL2 above the substrate 10. The insulating films 11, 12 and 13 are layered on the substrate 10, and the image scan signal line SL is formed on the insulating film 13.

A semiconductor layer of the transistor (transistor element) Tr1 shown in FIG. 3 is formed between the insulating film 11 and the insulating film 12. Since the semiconductor layer is on a cross section that is different from FIG. 4, the semiconductor layer is not illustrated in FIG. 4. A source region of the semiconductor layer is electrically connected to the image signal line SL formed in the conductive layer CL2. A drain region of the semiconductor layer is electrically connected to the pixel electrode PE formed in the conductive layer CL5. In a planar view, the scan signal line GL extends in a gap between the source region and the drain region of the semiconductor layer. The scan signal line GL overlaps a channel region of the semiconductor layer, and functions as the gate electrode of the transistor Tr1. The insulating film 12 that intervenes between the channel region and the scan signa line GL functions as a gate insulating film. As seen in the example described above, a TFT that is structured so that the gate electrode is arranged on an upper side of the channel region of the transistor Tr1 is called top gate mode. However, there are various modification examples of the TFT mode. For example, a bottom gate mode in which the gate electrode is arranged on a lower side of the channel region may be used. Alternatively, a mode in which the gate electrode is arranged on both the upper and lower sides of the channel region is also exemplified.

A wiring MW3 is arranged in the conductive layer CL3. The wiring MW3 is a metallic wiring made of a metal as similar to the scan signal line GL and the image signal line SL. The wiring MW3 is arranged at a position overlapping the image signal line SL in the thickness direction (Z direction). The wiring MW3 is electrically connected to the common electrode CE that is formed in the conductive layer CL4. In this case, the wiring MW3 can be used as a wiring for supplying a potential to the common electrode. Alternatively, when the display apparatus DSP1 has a touch panel function, the wiring MW3 is used as a signal transmission path in which a driving signal or a detection signal for use in detection of a touch position is transmitted.

In the conductive layer CL4, the common electrode CE is formed. The common electrode CE is formed on the insulating film 15 that is the planarizing film. FIG. 4 shows one common electrode CE. However, in the display region DA shown in FIG. 1, a plurality of common electrodes CE may be arranged so as to separate from one another. And, as described above, to the common electrode CE, the common potential among the plurality of subpixels PXs is supplied. Therefore, as shown in FIG. 4, the common electrode CE may be formed all over the plurality of subpixels PXs.

In the conductive layer CL5, a plurality of pixel electrodes PE are formed. The insulating film 16 that is the inorganic insulating film intervenes between the conductive layer CL5 where the pixel electrodes PE are formed and the conductive layer CL4 where the common electrode CE is formed. This insulating film 16 functions as the dielectric layer to form the capacitance element CS shown in FIG. 3.

The plurality of pixel electrodes PE are covered with the alignment film AL1. The alignment film AL1 is the organic insulating film having a function of unifying initial alignments of liquid crystal molecules contained in the liquid crystal layer LQ, and is made of, for example, a polyimide resin. The alignment film AL1 is in contact with the liquid crystal layer LQ.

As shown in FIG. 4, a light-blocking film BM, color filters CFR, CFG and CFB, an insulating film OC1 and an alignment film AL2 are formed on the back surface (main surface, plane) 20b of the substrate 20.

The color filters CFR, CFG and CFB are formed in a region closer to the back surface 20b that faces the substrate 10. In the example shown in FIG. 3, the color filters CFR, CFG and CFB of three colors that are red (R), green (G) and blue (B) are periodically arranged. In the color display apparatus, a color image is displayed by grouping, for example, the three-color pixels of the red (R), the green (G) and the blue (B) into one set. The plurality of color filters CFR, CFG and CFB of the substrate 20 are arranged at positions facing the respective pixels PX (see FIG. 1) having the respective pixel electrodes PE formed in the substrate 10. Note that types of the color filters are not limited to the three colors that are the red (R), the green (G) and the blue (B).

The light-blocking film BM is arranged boundaries among the color filters CFR, CFG and CFB of the respective colors. The light-blocking film BM is called black matrix, and is made of, for example, a black resin or a low-reflective metal. The light-blocking film BM is formed to have, for example, a grid form in a planar view. In other words, the light-blocking film BM extends in the X and the Y directions. More specifically, the light-blocking film BM has a plurality of portions extending in the Y direction and a plurality of portions extending in the X direction crossing the Y direction. Each pixel PX is partitioned by the black matrix, so that light leakage and color mixture can be suppressed.

In the display region DA, the light-blocking film BM overlaps the scan signal line GL, the image signal line SL and the wiring MW3 that are the metal wirings. Since the metal wiring having the light-blocking property is arranged at the position overlapping the light-blocking film BM, the metal wiring is difficult to be visually recognized on the display screen. On the other hand, at least a part of the common electrode CE and the pixel electrodes PE is arranged at a position not overlapping the light-blocking film BM. Each of the common electrode CE and the pixel electrodes PX is made of a visible-light transmittable conductive material. Therefore, even when the common electrode CE and the pixel electrodes PE are arranged at the positions not overlapping the light-blocking film BM, the visible light is not blocked at each subpixel PXs by the common electrode CE and the pixel electrodes PE.

The light-blocking film BM is also formed in the peripheral region PFA (see FIG. 1) of the substrate 20. The peripheral region PFA overlaps the light-blocking film BM. The display region DA is defined as an inner region of the peripheral region PFA. The peripheral region PFA is a region overlapping the light-blocking film BM that blocks the light that is emitted from the backlight unit (light source) BL shown in FIG. 2. While the light-blocking film BM is also formed inside the display region DA, the light-blocking film BM in the display region DA is formed to have a plurality of openings. Generally, among the openings which are formed in the light-blocking film BM and from which the color filters are exposed, an end of an opening that is formed in the closest region to an edge is defined as a boundary between the display region DA and the peripheral region PFA.

The insulating film OC1 shown in FIG. 4 covers the color filters CFR, CFG and CFB. The insulating film OC1 functions as a protective film that prevents impurities from spreading from the color filters to the liquid crystal layer. The insulating film OC1 is an organic insulating film made of, for example, an acrylic-based light-sensitive resin or others.

The insulating film OC1 is covered with the alignment film AL2. The alignment film AL2 is an organic insulating film having a function of unifying the initial alignments of the liquid crystal molecules contained in the liquid crystal layer LQ, and is made of, for example, a polyimide resin. The alignment film AL2 is in contact with the liquid crystal layer LQ.

<Details of Periphery of Transparent Region TRA>

Figure 5:
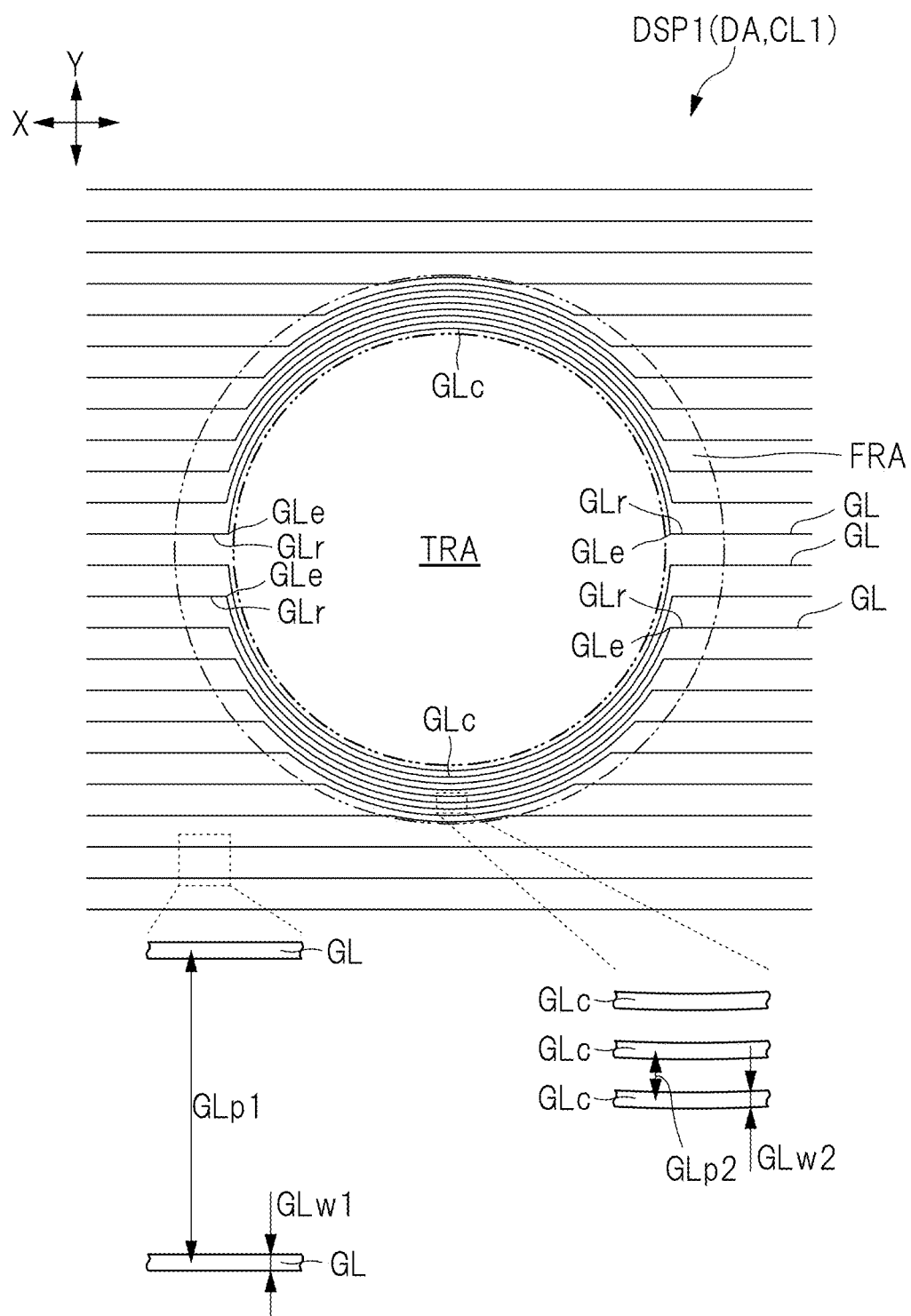
FIG. 5 is an enlarged plan view of a first conductive layer in periphery of a transparent region shown in FIG. 1.
Figure 6:
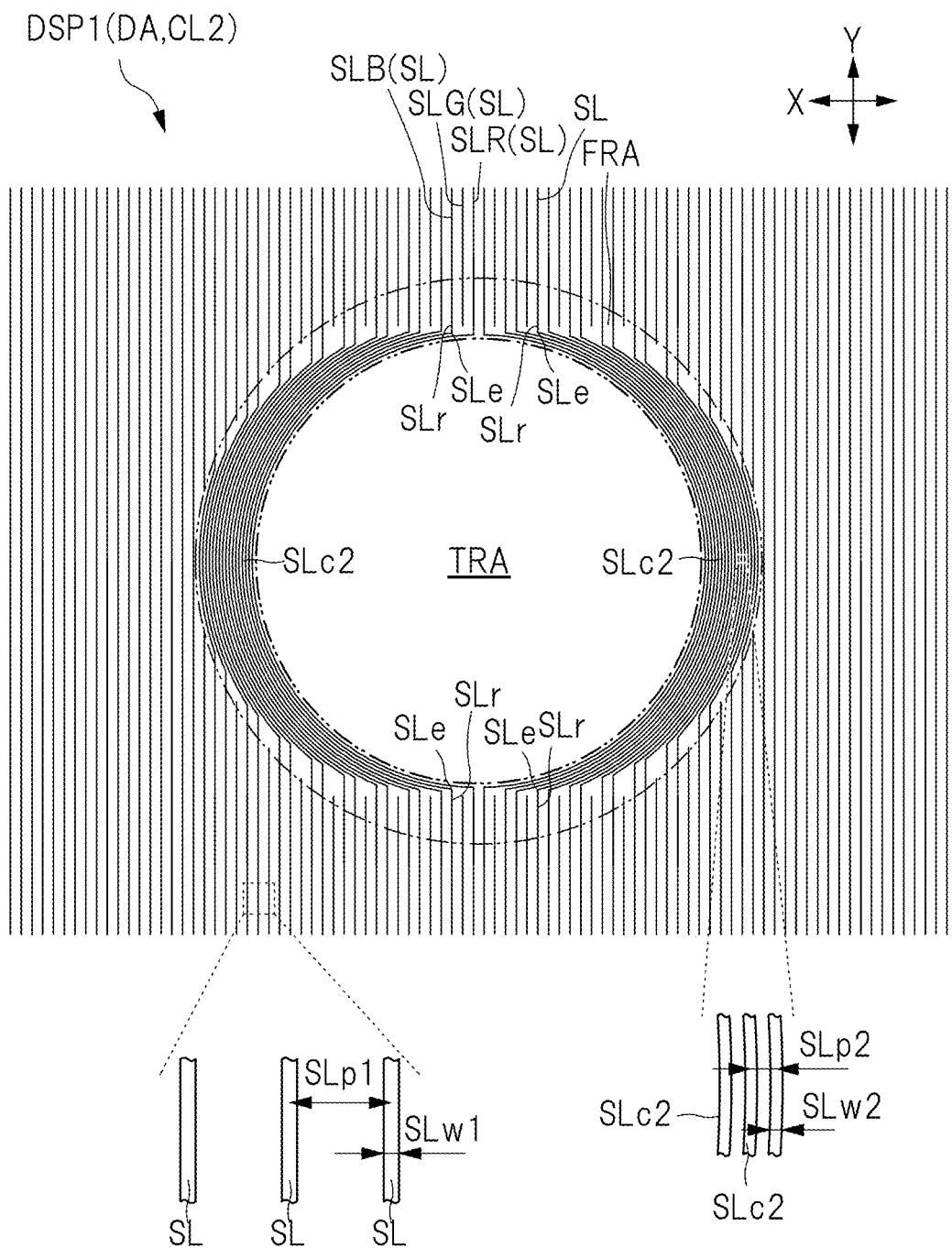
FIG. 6 is an enlarged plan view of a second conductive layer in periphery of the transparent region shown in FIG. 1.
Figure 7:
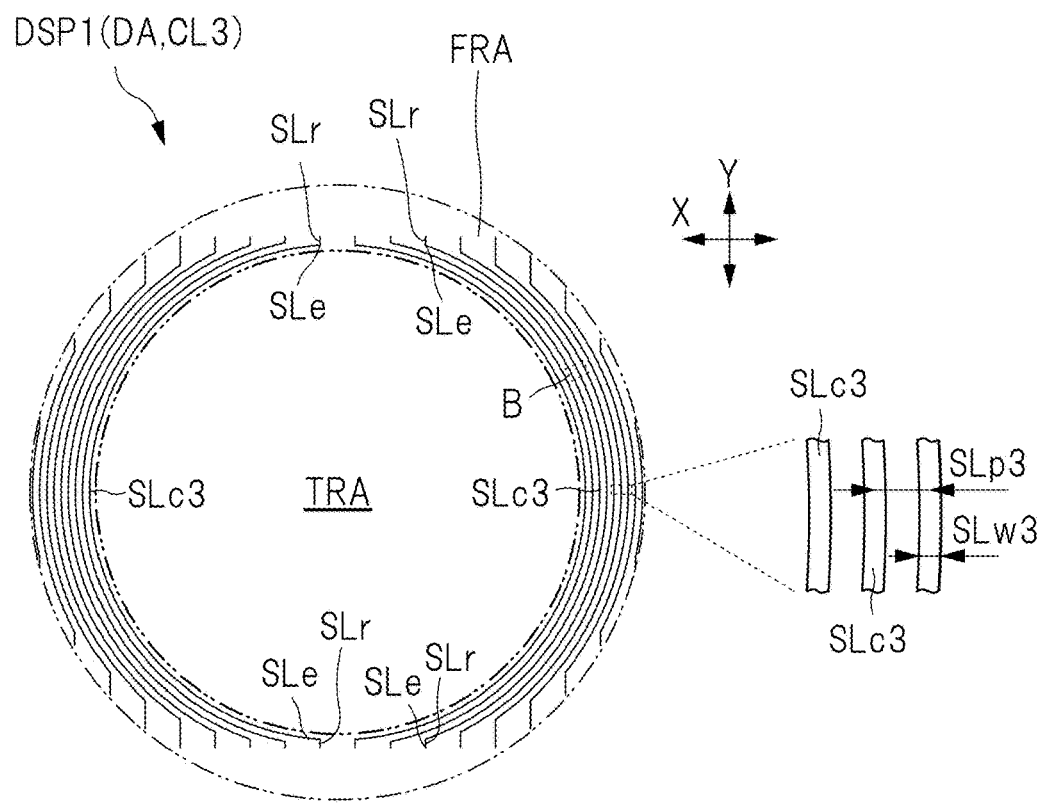
FIG. 7 is an enlarged plan view of a third conductive layer in periphery of the transparent region shown in FIG. 1.

Next, a periphery of the transparent region TRA shown in FIG. 1 will be explained in detail. FIG. 5 is an enlarged planar view of a first conductive layer in the periphery of the transparent region shown in FIG. 1. FIG. 6 is an enlarged planar view of a second conductive layer in the periphery of the transparent region shown in FIG. 1. FIG. 7 is an enlarged planar view of a third conductive layer in the periphery of the transparent region shown in FIG. 1.

As shown in FIG. 5, each of the plurality of scan signal lines GL extends in the X direction inside the display region DA. As shown in FIG. 6, each of the plurality of image signal lines SL extends in the Y direction inside the display region DA. As shown in FIG. 3, one subpixel PXs is formed at one cross point at which the scan signal line GL and the image signal line SL cross each other.

In this case, when the transparent region IRA is arranged inside the display region DA as shown in FIG. 5, the transparent region IRA is arranged on an extension line of an extension wiring portion (scan-signal extension wiring portion) GLr of some of the plurality of scan signal lines GL that linearly extend in the X direction. Similarly, when the transparent region IRA is arranged inside the display region DA as shown in FIG. 6, the transparent region IRA is arranged on an extension line of an extension wiring portion (image-signal extension wiring portion) SLr of some of the plurality of image signal lines SL that linearly extend in the Y direction. However, in order to improve the visible-light transmittable property of the transparent region IRA, it is preferable not to overlap the scan signal lines GL and the image signal lines SL that are the metallic wirings with the transparent region IRA. In the present application, a portion of each of the some of the scan signal lines GL and the image signal lines SL, the portion extending in one direction, is referred to as the extension wiring portion, and a portion thereof that avoids and bypasses the transparent region TRA is referred to as a bypass wiring portion. However, the term of "wiring portion" may be also simply referred to as "wiring". For example, even when the "extension wiring portion" is simply referred to as the "extension wiring" and even when the "bypass wiring portion" is simply referred to as the "bypass wiring", the meaning is the same.

Meanwhile, in order to use a region in the periphery of the transparent region TRA as the display region, it is necessary to avoid disconnection of the scan signal lines GL and the image signal lines SL near the transparent region IRA.

In the case of the display apparatus DSP1 of the present embodiment, as shown in FIG. 5, some of the plurality of scan signal lines GL have a plurality of extension wiring portions (scan-signal extension wiring portions) GLr that are arranged in the display region DA so as to extend in the X direction and a plurality of bypass wiring portions GLc that are arranged in the frame region FRA of the conductive layer CL1 so as to have both ends being connected to the plurality of extension wiring portions GLr. The bypass wiring portion GLc is a wiring that causes the transmission path for the scan signal to bypass along an outer edge of the transparent region TRA. In the present application, the bypass wiring portion GLc making up the transmission path for the scan signal is referred to as scan-signal bypass wiring portion in some cases. In the present application, the bypass wiring portion GLc is referred to as first-layer bypass wiring portion in some cases because of being formed in the conductive layer CL1 that is the first conductive layer. The bypass wiring portion GLc extends in a different direction from the X direction that is the extension direction of the extension wiring portion GLr. In the example shown in FIG. 5, each of the plurality of bypass wiring portions GLc extends in an arc form along the outer edge of the circular-shaped transparent region TRA. Each of the plurality of bypass wiring portions GLc has two ends GLe, and the extension wiring portion GLr is connected to each of the two ends GLe.

In the case of the display apparatus DSP1, as shown in FIG. 6, some of the plurality of image signal lines SL have a plurality of extension wiring portions (image-signal extension wiring portions) SLr that are arranged in the display region DA so as to extend in the Y direction and a plurality of bypass wiring portions SLc2 that are arranged in the frame region FRA of the conductive layer CL2 so as to have both ends being connected to the plurality of extension wiring portions SLr. The bypass wiring portion SLc2 is a wiring that causes the transmission path for the image signal to bypass along the outer edge of the transparent region TRA. In the present application, the bypass wiring portion SLc2 making up the transmission path for the image signal is referred to as image-signal bypass wiring portion in some cases. In the present application, the bypass wiring portion SLc2 is referred to as second-layer bypass wiring portion in some cases because of being formed in the conductive layer CL2 that is the second conductive layer. The bypass wiring portion SLc2 extends in a different direction from the Y direction that is the extension direction of the extension wiring portion SLr. In the example shown in FIG. 6, each of the plurality of bypass wiring portions SLc2 extends in an arc form along the outer edge of the circular-shaped transparent region TRA. Each of the plurality of bypass wiring portions SLc2 has two ends SLe, and the extension wiring portion SLr is connected to each of the two ends SLe.

In this case, the frame region FRA where the bypass wiring portion GLc shown in FIG. 5 and the bypass wiring portion SLc2 shown in FIG. 6 are arranged is different from the display region DA in the arrangement of the cross point between the scan signal line GL and the image signal line SL. Therefore, the frame region FRA is difficult to be used as the effective display region. Therefore, in order to increase the occupancy of the effective display region in a planar view, it is preferable to decrease an area of the frame region FRA. Accordingly, the inventor of the present application has studied a technique of decreasing the area the frame region FRA that surrounds the transparent region TRA.

A lower limit value of the number of the wirings (the scan signal liens GL or the image signal lines SL) that arranged in the frame region FRA is defined by a relation between the area of the transparent region TRA and an arrangement pitch between the wirings in the display region DA. For example, in a case of a planar circular shape of the transparent region TRA shown in FIG. 5, when a diameter of this circle is 1080 to 4050 μm and when the arrangement pitch (center-to-center distance) between the adjacent scan signal lines GL in the display region DA is 54 μm, at least 40 to 150 scan signal lines GL are arranged in the frame region FRA. Also, for example, in a case of the planar circular shape of the transparent region IRA shown in FIG. 6, when a diameter of this circle is 1080 to 4050 μm and when the arrangement pitch (center-to-center distance) between the adjacent image signal lines SL in the display region DA is 18 μm, at least 120 to 450 image signal lines SL are arranged in the frame region FRA.

In the case of the color display apparatus, the image signal lines SL for a plurality of color types are necessary. In the case of the present embodiment, the plurality of image signal lines SL shown in FIG. 6 include a plurality of image signal lines SLR in which an image signal for a first color (such as red) is transmitted, a plurality of image signal lines SLB in which an image signal for a second color (such as blue) is transmitted, and a plurality of image signal lines SLG in which an image signal for a third color (such as green) is transmitted. In this case, the arrangement pitch between the image signal lines SL is smaller than the arrangement pitch between the scan signal lines GL since three image signal lines SL are arranged for one pixel. Therefore, the number of the image signal lines SL that are arranged in the frame region FRA is larger than the number of the scan signal lines GL that are arranged in the frame region FRA. Therefore, as a factor that defines the lower limit value of the area of the frame region FRA, the number of the image signal lines SL is more dominant than the number of the scan signal lines GL. In a modification example of FIG. 5, note that the bypass wiring portion GLc may be not arranged in the frame region FRA in some cases as described later in the modification example.

In order to decrease the area of the frame region FRA, it is important to decrease the arrangement pitch between the image signal lines SL that are arranged in the frame region FRA shown in FIG. 6. In the case of the display apparatus DSP1, the arrangement pitch between the bypass wiring portions of the image signal lines SL that are arranged in the frame region FRA is smaller than the arrangement pitch between the image signal lines SL in the display region DA. For example, in the example shown in FIG. 6, an arrangement pitch SLp1 between the image signal lines SL in the display region DA is 18 μm. On the other hand, an arrangement pitch SLp2 between the bypass wiring portions SLc2 in the frame region FRA is 4.5 μm. In the case of the display apparatus DSP1, the arrangement pitch SLp2 between the bypass wiring portions SLc2 is smaller than the arrangement pitch SLp1 between the image signal lines SL in the display region DA, and therefore, the area of the frame region FRA can be decreased.

In the case of the display apparatus DSP1, the bypass wiring portion of the image signal line SL is formed in the plurality of conductive layers. That is, the plurality of bypass wiring portions of the plurality of image signal lines SL include a plurality of bypass wiring portions (second-layer bypass wiring portions) SLc2 that are arranged in the conductive layer CL2 shown in FIG. 6 and a plurality of bypass wiring portions (third-layer bypass wiring portions) SLc3 that are arranged in a conductive layer (third-conductive layer) CL3 shown in FIG. 7. An arrangement pitch SLp3 between the bypass wiring portions SLc3 is smaller than the arrangement pitch SLp1 between the image signal lines SL in the display region DA of the conductive layer CL2 shown in FIG. 6. The arrangement pitch SLp3 between the bypass wiring portions SLc3 is, for example, 9 μm.

In a display apparatus DSP2 shown in FIG. 18 described later as a modification example, note that all the bypass wiring portions SLc2 of the plurality of image signal lines SL are connected to the conductive layer CL2 while no bypass wiring portion is arranged in the conductive layer corresponding to the conductive layer CL3 shown in FIG. 7. Even in this case, when the arrangement pitch SLp2 between the bypass wiring portions SLc2 is made small, the increase in the frame region FRA can be suppressed. However, in the case of the display apparatus DSP1, the area of the frame region FRA can be further smaller than that of the display apparatus DSP2.

Figure 8:
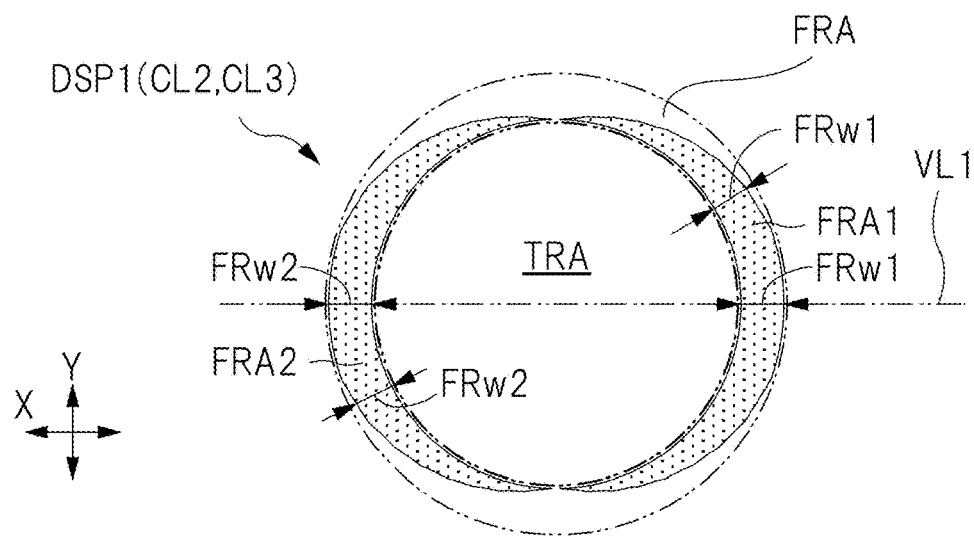
FIG. 8 is an enlarged plan view schematically showing a region where a plurality of bypass wiring portions shown in FIGS. 6 and 7 are arranged.

FIG. 8 is an enlarged planar view schematically showing a region where the plurality of bypass wiring portions shown in FIGS. 6 and 7 are arranged. In the display apparatus DSP1, as shown in FIG. 6, the plurality of bypass wiring portions SLc2 are arranged on both sides of the transparent region TRA in the X direction. Similarly, the plurality of bypass wiring portions SLc3 shown in FIG. 7 are arranged on both sides of the transparent region TRA in the X direction. In other words, as shown in FIG. 8, the frame region FRA includes a region (first region) FRA1 which is arranged adjacent to the transparent region TRA in the X direction and where one part of each of the plurality of bypass wiring portions SLc2 (see FIG. 6) and the plurality of bypass wiring portions SLc3 (see FIG. 7) is arranged. Also, the frame region FRA includes a region (second region) FRA2 which is opposite to the region FRA1 across the transparent region TRA and where the other part of each of the plurality of bypass wiring portions SLc2 and the plurality of bypass wiring portions SLc3 is arranged.

As shown in FIG. 8, when the bypass wiring portions SLc2 (see FIG. 6) and SLc3 (see FIG. 7) are arranged on the both sides of the transparent region TRA in the X direction, the area of the frame region FRA can be made smaller than that in a case in which the bypass wirings are arranged on only either one side of the transparent region TRA in the X direction.

In the case of the display apparatus DSP1, the number of the bypass wiring portions SLc2 (see FIG. 6) that are arranged in the region FRA1 shown in FIG. 8 and the number of the bypass wiring portions SLc2 that are arranged in the region FRA2 are equal to each other. The number of the bypass wiring portions SLc3 (see FIG. 7) that are arranged in the region FRA1 and the number of the bypass wiring portions SLc3 that are arranged in the region FRA2 are equal to each other. In other words, the bypass wiring portions SLc2 and SLc3 are arranged to be well balanced between the both sides of the transparent region IRA in the X direction. For example, in the example shown in FIG. 6, each of the number of the bypass wiring portions SLc2 that are arranged in the region FRA1 (see FIG. 8) and the number of the bypass wiring portions SLc2 that are arranged in the region FRA2 (see FIG. 8) is 18. In the example shown in FIG. 7, each of the number of the bypass wiring portions SLc3 that are arranged in the region FRA1 (see FIG. 8) and the number of the bypass wiring portions SLc3 that are arranged in the region FRA2 (see FIG. 8) is 9. In the examples shown in FIGS. 6 and 7, note that one example of the small number of the image signal lines SL is illustrated in order to easily view the drawings. Therefore, it is needless to say that there are not only the examples shown in FIGS. 6 and 7 but also various modification examples for the number of the image signal lines SL and the total number of the bypass wiring portions SLc2 and SLc3. For example, when 120 to 450 image signal lines SL are arranged in total in the frame region FRA as described above, there is a case of 40 to 150 bypass wiring portions as each of the number of the bypass wiring portions SLc2 that are arranged in the frame region FRA1 and the number of the bypass wiring portions SLc2 that are arranged in the frame region FRA2. This case has 20 to 75 bypass wiring portions as each of the number of the bypass wiring portions SLc3 that are arranged in the frame region FRA1 and the number of the bypass wiring portions SLc3 that are arranged in the frame region FRA3.

Since the bypass wiring portions SLc2 and SLc3 are arranged to be well balanced, shapes of the region FRA1 and the region FRA2 are axisymmetric with respect to a center line that goes through a center of the transparent region TRA in the Y direction. In this case, the region in the periphery of the transparent region TRA can be effectively used as the arrangement region for the bypass wiring portions, and therefore, the area of the frame region FRA can be made smaller than that in a case of the much different numbers of the bypass wiring portions in the frame regions FRA1 and FRA2 from each other. When the total number of the bypass wiring portions is even, the bypass wiring portions in the frame regions FRA1 and FRA2 can be arranged so that the numbers of them are equal to each other as similar to the display apparatus DSP1. However, when the total number of the bypass wiring portions is odd, the number of the bypass wiring portions in either one of the frame regions FRA1 and FRA2 may be one larger than the other.

Each of the plurality of bypass wiring portions SLc2 (see FIG. 6) and the plurality of bypass wiring portions SLc3 (see FIG. 7) that are arranged in the region FRA1 shown in FIG. 8 extends in an arc form along the outer edge of the transparent region TRA. A planar shape of the region FRA1 is a crescent moon shape. A width FRw1 of the region FRA1 changes depending on a position in the Y direction, and is the largest at a position overlapping a first virtual line VL1 that extends in the X direction from the center of the transparent region IRA. Similarly, each of the plurality of bypass wiring portions SLc2 and the plurality of bypass wiring portions SLc3 that are arranged in the region FRA2 extends in an arc form along the outer edge of the transparent region TRA. A planar shape of the region FRA2 is a crescent moon shape. A width FRw2 of the region FRA2 changes depending on a position in the Y direction, and is the largest at a position overlapping the first virtual line VL1 that extends in the X direction from the center of the transparent region IRA. Note that the width of each of the regions FRA1 and FRA2 is defined to be a length in a direction that is orthogonal to a tangent line to the bypass wiring portion that is arranged in the innermost circumference of each region. The farther a position from the virtual line VL1 is, the smaller the width FRw1 or FRw2 is.

As shown in FIG. 5, in the case of the display apparatus DSP1, the plurality of scan signal lines GL also have bypass wiring portions GLc. Some of the plurality of scan signal lines GL include a plurality of extension wiring portions (scan-signal extension wiring portions) GLr that are arranged in the display region DA so as to extend in the X direction and a plurality of bypass wiring portions GLc that are arranged in the frame region FRA of the conductive layer CL1 so as to have both ends being connected to the plurality of extension wiring portions GLr.

As described above, the number of the scan signal lines GL corresponding to one pixel PX (see FIG. 3) is smaller than the number of the image signal lines SL. Therefore, when a shape of the frame region FRA is circular, an arrangement pitch GLp2 between the plurality of bypass wiring portions GLc has a margin in comparison with the arrangement pitch SLp2 between the plurality of bypass wiring portions SLc2 shown in FIG. 6. However, when the plurality of bypass wiring portions GLc are arranged in the frame region FRA, it is preferable to decrease the arrangement pitch GLp2. In the case shown in FIG. 5, the arrangement pitch GLp2 between the bypass wiring portions GLc is smaller than the arrangement pitch GLp1 between the plurality of scan signal lines GL in the display region DA. In the case shown in FIG. 5, the arrangement pitch GLp1 between the scan signal lines GL in the Y direction is 54 μm. On the other hand, the arrangement pitch GLp2 between the bypass wiring portions GLc of the scan signal lines GL in the Y direction is 9 μm. In this case, the width of the frame region FRA in the Y direction can be decreased, and therefore, the area of the frame region FRA can be resultantly decreased.

Figure 9:
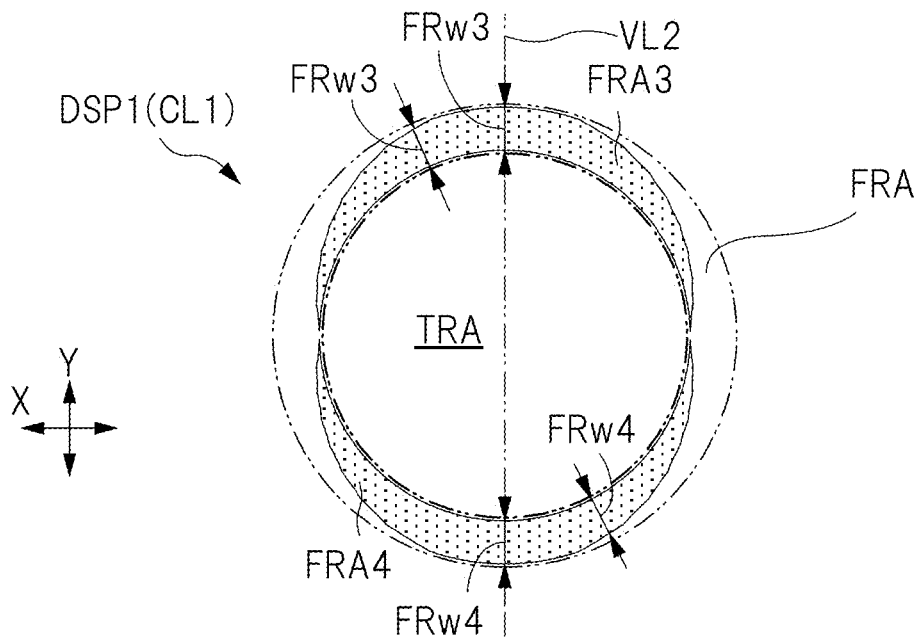
FIG. 9 is an enlarged plan view schematically showing a region where a plurality of bypass wiring portions shown in FIG. 5 are arranged.

FIG. 9 is an enlarged planar view schematically showing a region where the plurality of bypass wiring portions shown in FIG. 5 are arranged. In the display apparatus DSP1, as shown in FIG. 5, the plurality of bypass wiring portions GLc are arranged on both sides of the transparent region IRA in the Y direction. In other words, as shown in FIG. 9, the frame region FRA includes a region (third region) FRA3 which is arranged adjacent to the transparent region TRA in the Y direction and where one part of each of the plurality of bypass wiring portions GLc (see FIG. 5) is arranged. Also, the frame region FRA includes a region (fourth region) FRA4 which is opposite to the region FRA3 across the transparent region TRA and where the other part of each of the plurality of bypass wiring portions GLc is arranged.

In the case of the display apparatus DSP1, the number of the bypass wiring portions GLc (see FIG. 5) that are arranged in the region FRA3 shown in FIG. 9 and the number of the bypass wiring portions GLc that are arranged in the region FRA4 are equal to each other. In other words, the bypass wiring portions GLc are arranged to be well balanced on the both sides of the transparent region TRA in the Y direction so that the numbers of them are equal to each other. For example, in the example shown in FIG. 5, each of the number of the bypass wiring portions GLc that are arranged in the region FRA3 (see FIG. 9) and the number of the bypass wiring portions GLc that are arranged in the region FRA4 (see FIG. 9) is 9. Note that the example of FIG. 5 shows the case with the small number of the scan signal lines GL in consideration of easiness of view of the drawings. Therefore, it is needless to say that there is not only the example of FIG. 5 but also various modification examples for the total number of the bypass wiring portions GLc. For example, when 40 to 150 scan signal lines GL are arranged in total in the frame region FRA as described above, there is a case with 20 to 75 bypass wiring portions as each of the number of the bypass wiring portions GLc that are arranged in the frame region FRA3 and the number of the bypass wiring portions GLc that are arranged in the frame region FRA4. When the total number of the bypass wiring portions GLc is odd, the number of the bypass wiring portions in either one of the frame regions FRA3 and FRA4 may be one larger than the other.

Each of the plurality of bypass wiring portions GLc (see FIG. 5) that are arranged in the region FRA3 shown in FIG. 9 extends in an arc form along the outer edge of the transparent region TRA. A planar shape of the region FRA3 is a crescent moon shape. A width FRw3 of the region FRA3 changes depending on a position in the X direction, and is the largest at a position overlapping a second virtual line VL2 that extends in the Y direction from the center of the transparent region TRA. Similarly, each of the plurality of bypass wiring portions GLc that are arranged in the region FRA4 extends in an arc form along the outer edge of the transparent region TRA. A planar shape of the region FRA4 is a crescent moon shape. A width FRw4 of the region FRA4 changes depending on a position in the X direction, and is the largest at a position overlapping the second virtual line VL2 that extends in the Y direction from the center of the transparent region TRA. Note that the width of each of the regions FRA3 and FRA4 is defined to be a length in a direction that is orthogonal to a tangent line to the bypass wiring portion that is arranged in the innermost circumference of each region. The farther a position from the virtual line VL2 is, the smaller the width FRw3 or FRw4 is.

As described with reference to FIG. 6, the plurality of image signal lines SL include the plurality of image signal lines SLR in which the image signal for the first color (such as red) is transmitted, the plurality of image signal lines SLB in which the image signal for the second color (such as blue) is transmitted, and the plurality of image signal lines SLG in which the image signal for the third color (such as green) is transmitted. In the case of the display apparatus DSP1, the plurality of image signal lines SLR and the plurality of image signal lines SLB shown in FIG. 6 are connected to the plurality of bypass wiring portions SLc2 in the frame region FRA, and the plurality of image signal lines SLG are connected to the plurality of bypass wiring portions SLc3 in the frame region FRA shown in FIG. 7. In a case of connection of some of the plurality of image signal lines SL to the bypass wiring portion SLc3 of the conductive layer CL3 shown in FIG. 7 as seen in the display apparatus DSP1, types of the image signal lines SL that are connected to the bypass wiring portions SLc3 are preferably the same type of the image signal lines SL among the plurality of types of the image signal lines SL. The bypass wiring portions SLc2 and the bypass wiring portions SLc3 are different from each other in values of a wiring resistance, a capacitance load and others. Therefore, in a case of connection of the image signal line SL for a specific color to the bypass wiring portion SLc3, at the time of the display in the raster mode that displays the image by setting a color density for each pixel, unevenness due to the connection of some of the image signal lines SL to the bypass wiring portion SLc3 can be reduced. For example, in a case of connection of only the image signal line SL for a specific color to the bypass wiring portion SLc3, a signal intensity of the image signal that is supplied to the bypass wiring portion SLc3 can be adjusted.

Figure 10:
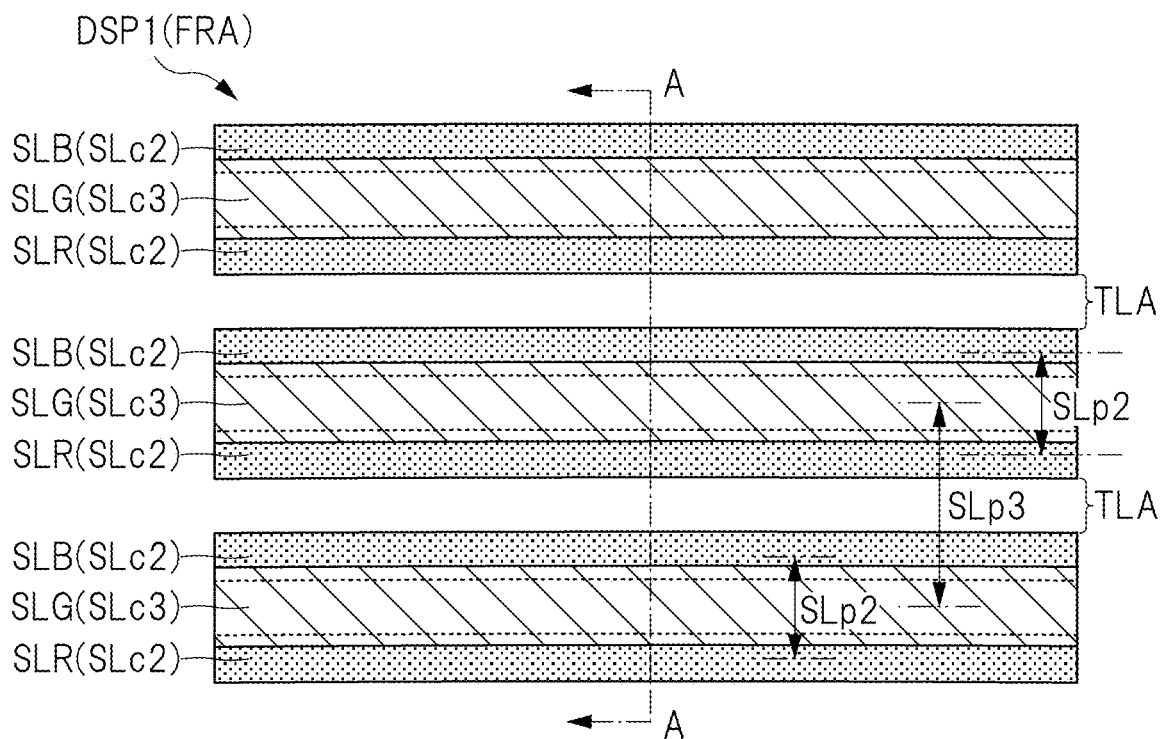
FIG. 10 is an enlarged plan view showing a state in which the bypass wirings shown in FIGS. 6 and 7 overlap a "B" portion of FIG. 7.
Figure 11:
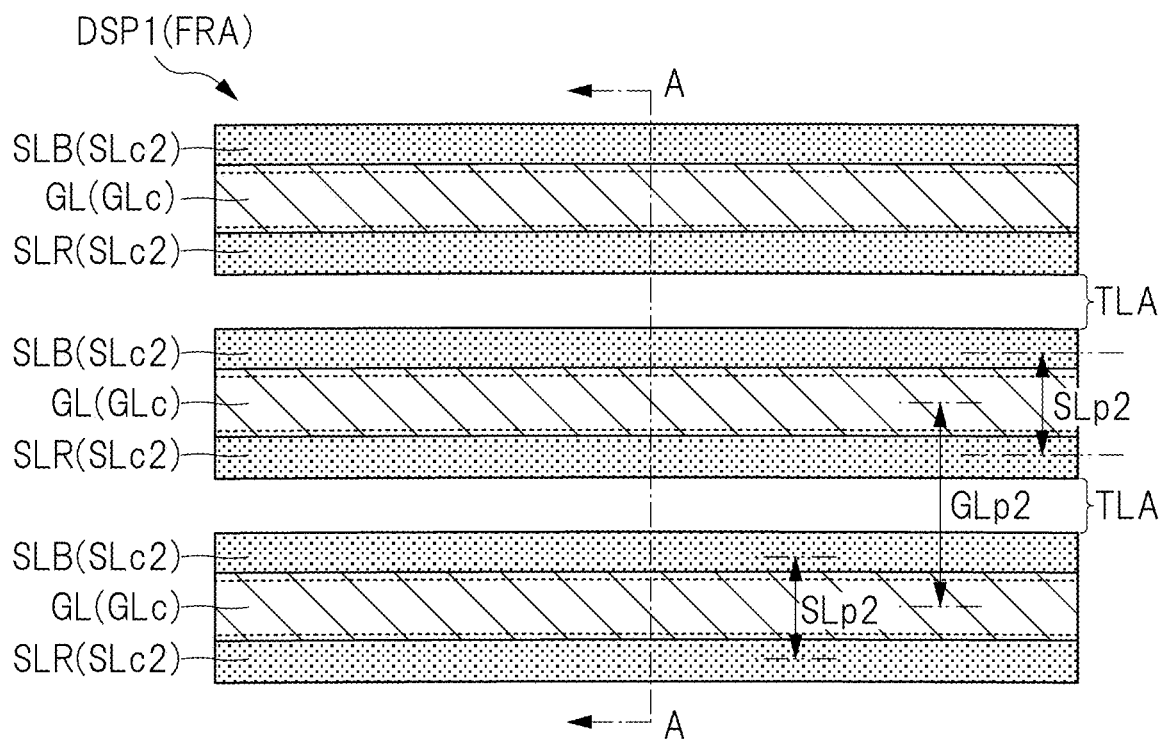
FIG. 11 is an enlarged plan view showing a state in which the bypass wirings shown in FIGS. 5 and 6 overlap the same position as that of FIG. 10.
Figure 12:
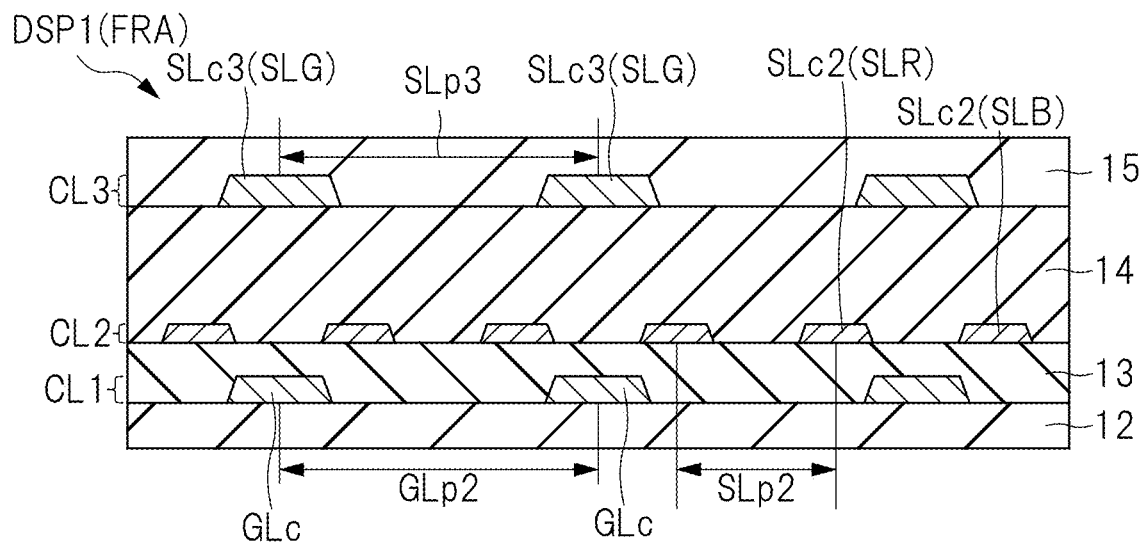
FIG. 12 is an enlarged cross-sectional view taken along a line A-A of FIGS. 10 and 11.

FIG. 10 is an enlarged planar view showing an overlap state of the bypass wirings shown in FIGS. 6 and 7 at a "B" portion shown in FIG. 7. FIG. 11 is an enlarged planar view showing an overlap state of the bypass wirings shown in FIGS. 5 and 6 at the same portion as that of FIG. 10. FIG. 12 is an enlarged cross-sectional view taken along a line A-A shown in FIGS. 10 and 11. FIGS. 10 and 11 are planar views but are added with a dot pattern or a hatching in order to easily see a planar-view positional relation among the bypass wiring portions that are arranged in the respective conductive layers. More specifically, the wiring that is formed in the conductive layer CL2 shown in FIG. 12 is added with the dot pattern, and the wirings that are formed in the conductive layer CL1 and the conductive layer CL3 are added with the hatching. In a region where the bypass wiring portion SLc2 and the bypass wiring portion SLc3 overlap each other, an outline of the bypass wiring portion SLc2 is illustrated with a dot line.

As shown in FIG. 10, a pair of the image signal line SLR and the image signal line SLB are arranged so as to be adjacent to each other in the frame region FRA, and the image signal line SLG is arranged between the pair of the image signal line SLR and the image signal line SLB in a planar view. In a planar view, the arrangement pitch SLp3 between the plurality of bypass wiring portions SLc3 that are adjacent to each other is larger than the arrangement pitch SLp2 between the plurality of bypass wiring portions SLc2 that are adjacent to each other. For example, the arrangement pitch SLp3 between the plurality of bypass wiring portions SLc3 is 9 μm, and the arrangement pitch SLp2 between the bypass wiring portions SLc2 in the frame region FRA is 4.5 μm.

As shown in FIG. 10, since the bypass wiring portion SLc3 is arranged between the adjacent bypass wiring portions SLc2 in a planar view, variation in the capacitance load on each of the plurality of bypass wiring portions SLc2 can be reduced. By the above-described layout, variation in the capacitance load on each of the plurality of bypass wiring portions SLc3 can be reduced.

As shown in FIG. 11, a pair of the image signal line SLR and the image signal line SLB are arranged so as to be adjacent to each other in the frame region FRA, and the scan signal line GL is arranged between the pair of the image signal line SLR and the image signal line SLB in a planar view. In a planar view, the arrangement pitch GLp2 between the plurality of bypass wiring portions GLc that are adjacent to each other is larger than the arrangement pitch SLp2 between the plurality of bypass wiring portions SLc2 that are adjacent to each other.

As shown in FIG. 11, since the bypass wiring portion GLc is arranged between the bypass wiring portions SLc2 that are adjacent to each other in a planar view, variation in the capacitance load on each of the plurality of bypass wiring portions SLc2 can be reduced. By the above-described layout, variation in the capacitance load on each of the plurality of bypass wiring portions GLc can be reduced.

As shown in FIG. 12, in a planar view, the plurality of bypass wiring portions GLc of the scan signal line GL and the plurality of bypass wiring portions SLc3 of the image signal line SLG overlap each other. While FIG. 12 is the cross-sectional view, it is obvious that the plurality of bypass wiring portions GLc and the plurality of bypass wiring portions SLc3 overlap each other in a planar view when the A-A lines shown in FIGS. 10 and 11 overlap each other. As shown in FIG. 10 or 11, in a gap between the pairs that are adjacent to each other in a planar view, the plurality of bypass wiring portions GLc of the scan signal line GL and the plurality of bypass wiring portions SLc3 of the image signal line SLG are not arranged. Therefore, as shown in FIGS. 10 and 11, the gap between the pairs that are adjacent to each other (for example, a gap between the adjacent bypass wiring portions SLc3 or a gap between the adjacent scan signal lines GL) has a light-transmittable region TLA that extends in an extension direction of the plurality of bypass wiring portions SLc2.

As shown in FIG. 12, in the frame region FRA, the light-blocking metallic wirings (the conductive layer CL1, the conductive layer CL2 and the conductive layer CL3) are densely arranged. As described later with reference to FIG. 16, in the frame region FRA, the sealing member SLM is often arranged so as to overlap the light-blocking metallic wirings. In this case, the sealing member SLM contains an ultraviolet-ray curable resin. When ultraviolet ray is emitted to the sealing member SLM, the sealing member SLM is hardened, so that the substrate 10 and the substrate 20 are adhered to each other. By the hardening of the sealing member SLM that is between the substrate 10 and the substrate 20, the liquid crystals can be prevented from entering from the display region DA to the transparent region TRA. In this case, the transparency of the transparent region TRA can be prevented from being inhibited by the liquid crystals. In the hardening of the sealing member SLM that is the ultraviolet-ray curable resin in the frame region FRA, it is necessary to emit the ultraviolet ray to the sealing member SLM. While the light-blocking metallic wirings are densely arranged in the frame region FRA, the light-transmittable region TLA is arranged in the frame region FRA as shown in FIGS. 10 and 11. Therefore, the ultraviolet ray penetrates the region TLA, and is emitted to the sealing member SLM, and thus, can harden the sealing member SLM. As shown in FIGS. 10 and 11, since the plurality of regions TLA are continuously arranged, the ultraviolet ray is easy to be emitted to the sealing member SLM.

The configurations shown in FIGS. 10 to 12 can be expressed as follows. As shown in FIG. 12, the plurality of image signal lines SL include the plurality of image signal lines SLR in which the image signal for the first color (such as red) is transmitted, the plurality of image signal lines SLB in which the image signal for the second color (such as blue) is transmitted, and the plurality of image signal lines SLG in which the image signal for the third color (such as green) is transmitted. As shown in FIG. 11, in a planar view, one of the image signal lines SLR and one of the image signal lines SLB are arranged between the adjacent bypass wiring portions GLc. As shown in FIG. 12, the plurality of bypass wiring portions SLc3 overlap the plurality of bypass wiring portions GLc, and are connected to the plurality of image signal lines SLG.

Figure 16:
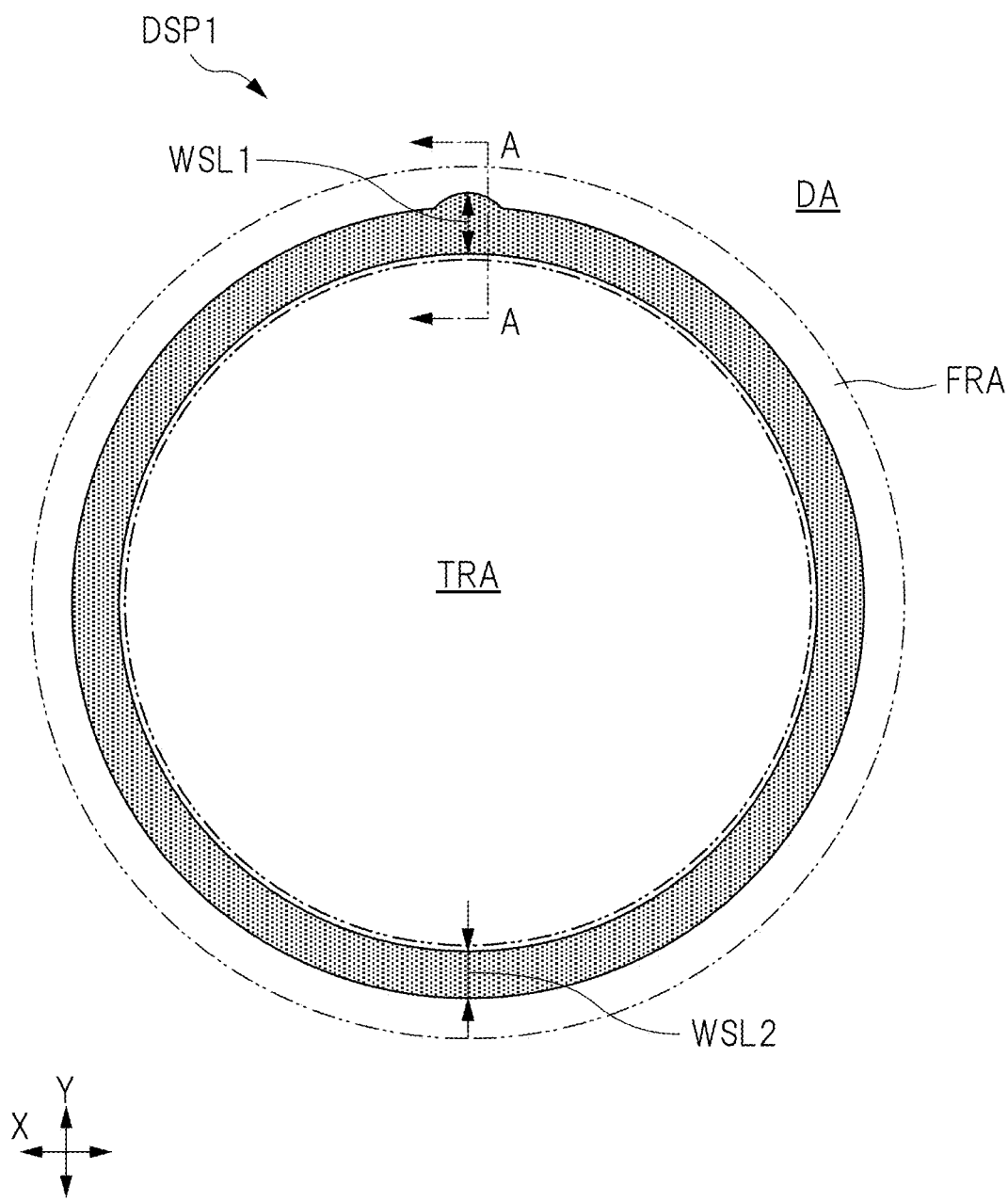
FIG. 16 is an enlarged plan view showing a planar shape of a sealing member arranged in the frame region in periphery of the transparent region shown in FIG. 1.

Note that the above is the explanation of the example of the hardening of the sealing member SLM shown in FIG. 16 by the ultraviolet ray. However, the insulating film 14 or the insulating film 15 shown in FIG. 12 may contain the ultraviolet-ray curable resin. The frame region FRA overlaps the light-blocking film BM shown in FIG. 4 in some cases. When there are the plurality of regions TLA as shown in FIGS. 10 and 11, the emission of the ultraviolet ray in a direction from the substrate 10 can reach the sealing member SLM shown in FIG. 16. Therefore, in a region closer to the substrate 20, it may be acceptable that the entire frame region FRA overlaps the light-blocking film BM shown in FIG. 4.

Figure 13:
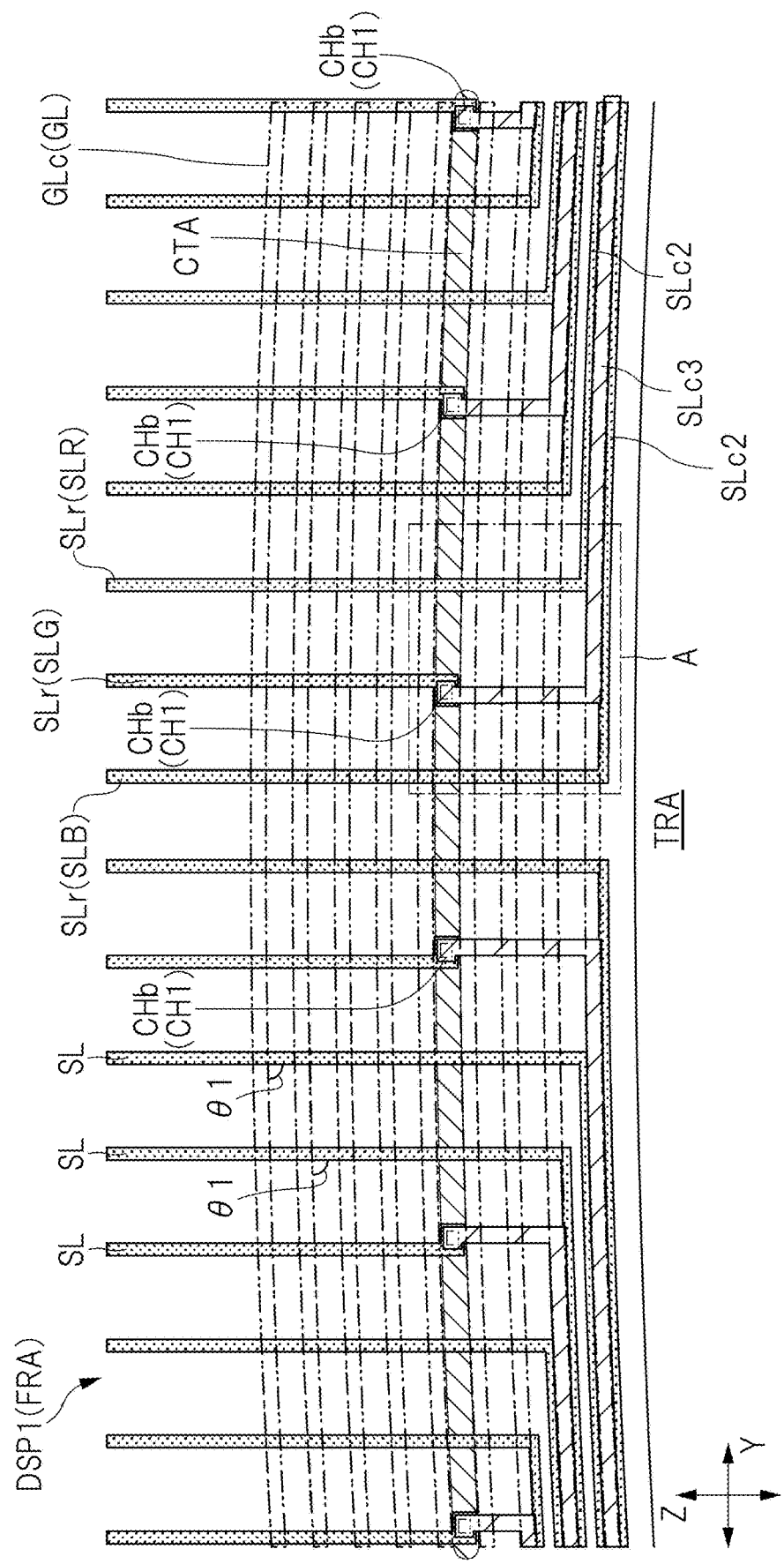
FIG. 13 is an enlarged plan view in periphery of a portion connecting the second conductive layer shown in FIG. 6 and the third conductive layer shown in FIG. 7.
Figure 14:
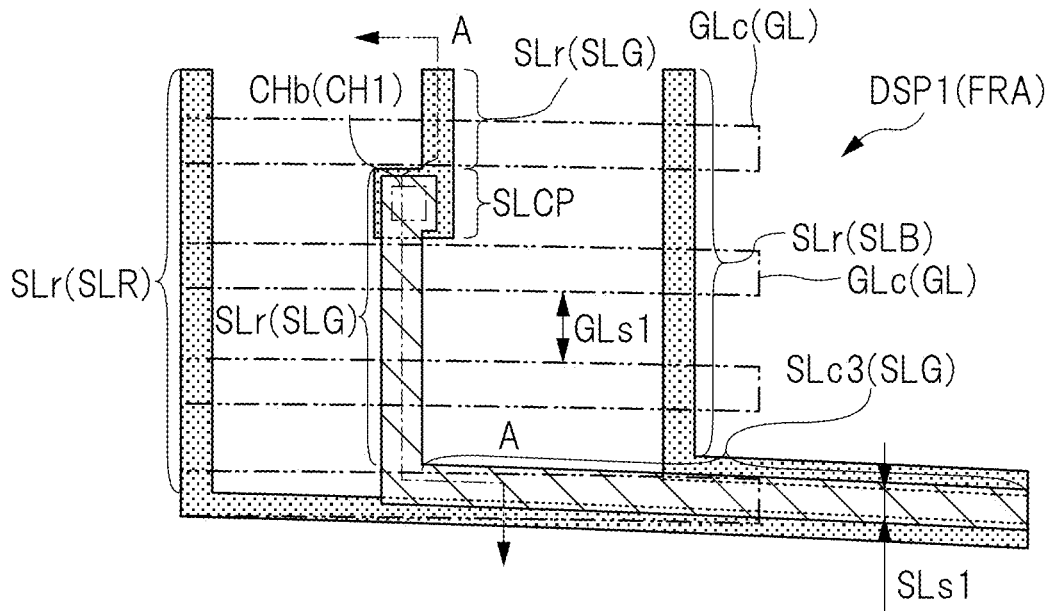
FIG. 14 is an enlarged plan view of an "A" portion of FIG. 13.
Figure 15:
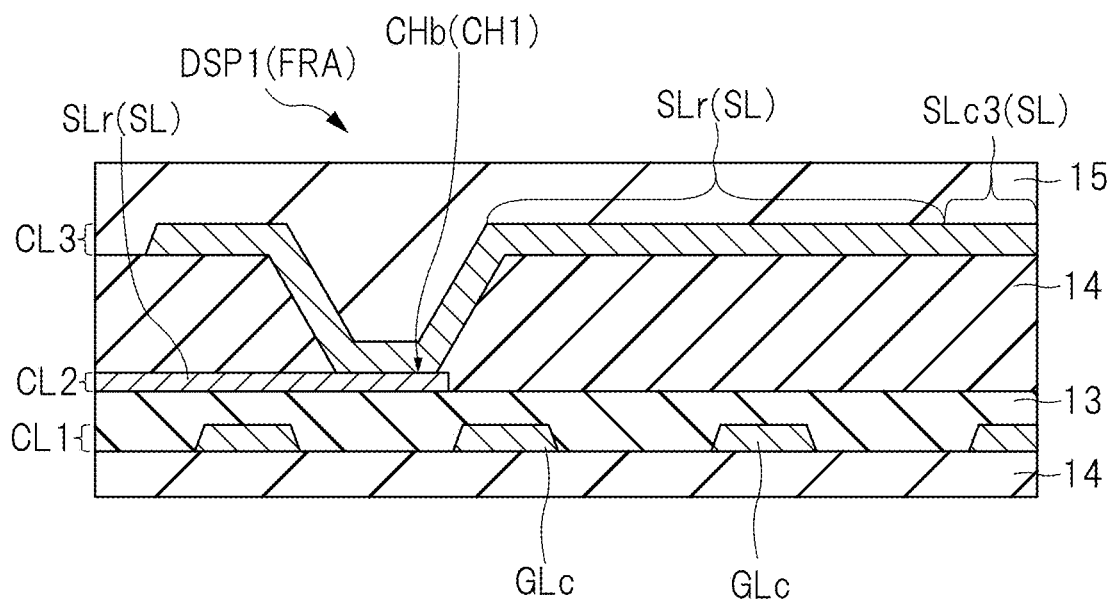
FIG. 15 is an enlarged cross-sectional view taken along a line A-A of FIG. 14.

Next, a structure of connection between the extension wiring portion SLr of the image signal line SL shown in FIG. 6 and the bypass wiring portion SLc3 shown in FIG. 7 will be explained. FIG. 13 is an enlarged planar view in periphery of a portion that connects the second conductive layer shown in FIG. 6 and the third conductive layer shown in FIG. 7. FIG. 14 is an enlarged planar view of an "A" portion of FIG. 13. FIG. 15 is an enlarged cross-sectional view taken along a line A-A line of FIG. 14. While FIGS. 13 and 14 are planar views, the wirings formed in the conductive layer CL2 shown in FIG. 15 are added with the dot pattern, and the wirings that are formed in the conductive layer CL3 are added with the hatching. In FIGS. 13 and 14, each of an outline of the scan signal line GL formed in the conductive layer CL1 shown in FIG. 15 and an outline of the base surface CHb of the contact hole CH1 is illustrated with a dashed double-dotted line. In FIG. 13, a contact region CTA where the plurality of contact holes CH1 are arranged is added with a hatching. In FIG. 14, in a region where the bypass wiring portion SLc2 and the bypass wiring portion SLc3 overlap each other, an outline of the bypass wiring portion SLc2 is illustrated with a dotted line. The bypass wiring portion GLc is illustrated with a dashed double-dotted line.

As shown in FIGS. 13 to 15, in the frame region FRA, the contact hole CH1 that electrically connects the conductive layer CL2 (see FIG. 15) and the conductive layer CL3 (see FIG. 15) is formed. As shown in FIG. 15, the contact hole CH1 is an opening that is formed to hole the insulating film 14. At the base surface CHb of the contact hole CH1, a part of the extension wiring portion SLr of the image signal line SL is exposed from the insulating film 14. A metallic pattern is formed at the exposed portion of the extension wiring portion SLr from the insulating film 14, and this metallic pattern extends toward the bypass wiring portion SLc3 that is formed in the conductive layer CL3. The extension wiring portion SLr that is formed in the conductive layer CL2 and the bypass wiring portion SLc3 that is formed in the conductive layer CL3 are electrically connected to each other through the contact hole CH1. As shown in FIG. 13, the frame region FRA includes the contact region CTA where the plurality of contact holes CH1 that electrically connect the conductive layer CL2 and the conductive layer CL3 are arranged along the X direction.

As shown in FIG. 14, a contact SLCP having a larger width (length in the Y direction) than that of the extension wiring portion SLr is connected to an end of the extension wiring portion SLr of the image signal line SLG. In the contact SLCP, the base surface CHb of the contact hole CH1 is arranged. In order to improve reliability of the connection between the conductive layer CL2 (see FIG. 15) and the conductive layer CL3 (see FIG. 15), it is preferable to increase an area of the base surface CHb of the contact hole CH1. Therefore, the contact SLCP has the larger width than that of the extension wiring portion SLr. Meanwhile, a portion having the conductor pattern with a large area formed in the conductive layer CL2 has a large capacitance load due to this conductor pattern. Therefore, as shown in FIG. 14, in a planar view, each base surface CHb of the plurality of contact holes CH1 is preferably formed at a position not overlapping the plurality of scan signal lines GL. In this manner, the mutual capacitance load between the contact SLCP and the plurality of scan signal lines GL can be reduced.

In order to reduce the mutual capacitance load between the contact SLCP and the plurality of scan signal lines GL, it is particularly preferable to avoid the overlapping of the entire contact SLCP of the image signal line SLG with the scan signal line GL. However, the contact SLCP is formed in the frame region where the bypass wiring portions GLc of the scan signal lines GL are densely arranged. Therefore, it is difficult to arrange the entire contact SLCP of the image signal line SLG so as not to overlap the scan signal line GL in some cases. Even in such a case, at least when the respective base surfaces CHb of the plurality of contact holes CH1 are formed at the position not overlapping the plurality of scan signal lines GL, the mutual capacitance load between the contact SLCP and the plurality of scan signal lines GL can be reduced.

In the case shown in FIG. 14, a separate distance GLs1 between the bypass wiring portions GLc of the adjacent scan signal lines GL is larger than a separate distance SLs1 between the bypass wiring portions SLc2 of the adjacent image signal lines SL. When the separate distance GLs1 between the bypass wiring portions GLc of the adjacent scan signal lines GL is large as described above, it is easy to achieve the layout of the respective base surfaces CHb of the plurality of contact holes CH1 at the positions not overlapping the plurality of scan signal lines GL. As explained with reference to FIGS. 5 and 6, the number of the scan signal lines GL that are arranged in the frame region FRA is smaller than the number of the image signal lines SL that are arranged in the frame region FRA. Therefore, when the shape of the frame region is circular, the arrangement pitch between the bypass wiring portions SLc2 of the image signal lines SL is dominant as the factor for defining the area of the frame region FRA, and thus, the increase in the area of the frame region FRA can be suppressed even if the separate distance GLs1 between the bypass wiring portions GLc is large.

Figure 17:
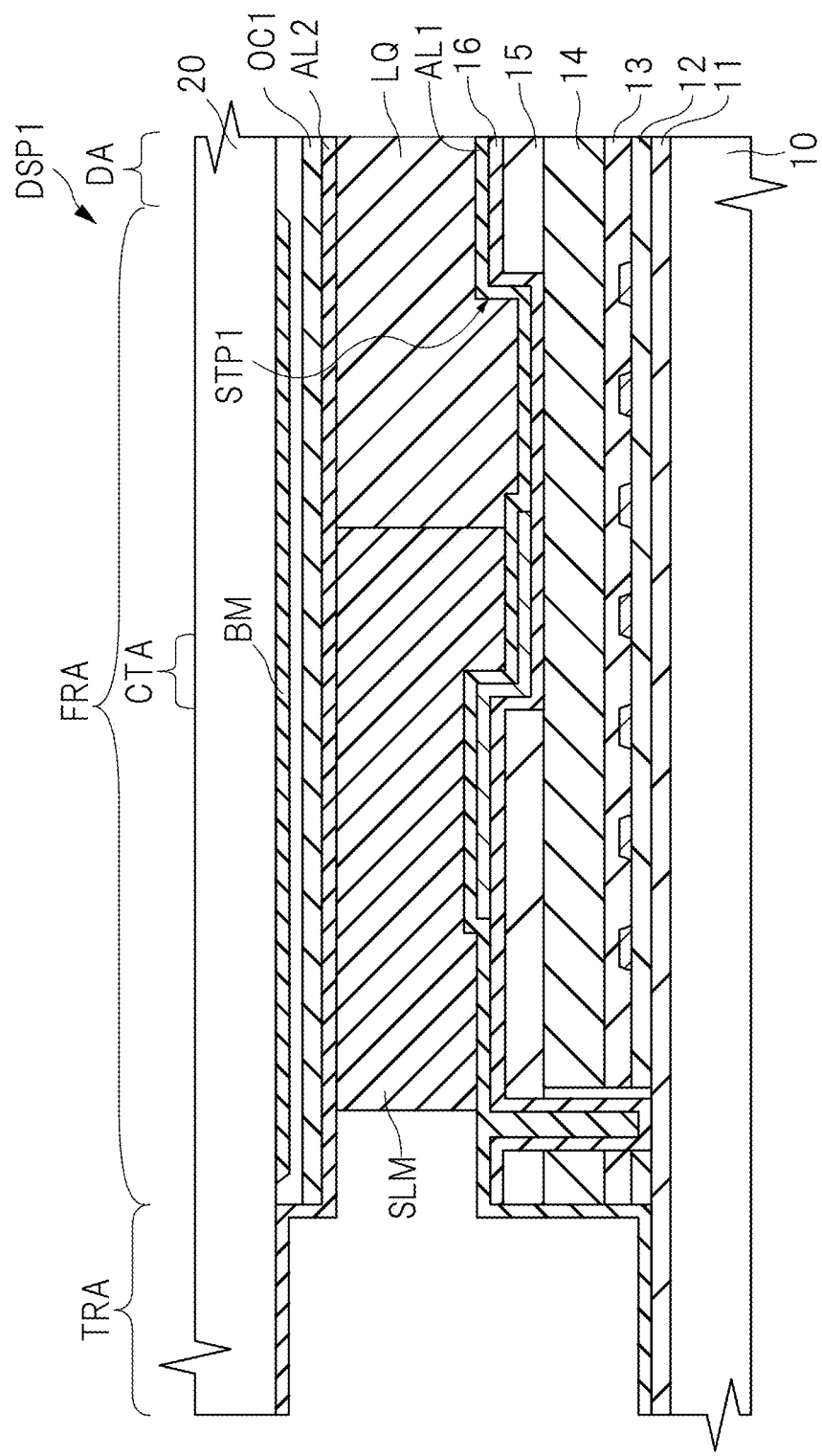
FIG. 17 is an enlarged cross-sectional view taken along a line A-A of FIG. 16.

FIG. 16 is an enlarged planar view showing a planar shape of a sealing member that is arranged in the frame region in the periphery of the transparent region TRA shown in FIG. 1. FIG. 17 is an enlarged cross-sectional view taken along a line A-A of FIG. 16. As shown in FIG. 16, the display apparatus DSP1 includes a sealing member SLM that is arranged in the frame region FRA so as to surround the transparent region IRA in a planar view and that fixedly bonds the substrate 10 (see FIG. 17) and the substrate 20 (see FIG. 17). This sealing member SLM is made of the same material as that of the sealing member SLM that is arranged in the peripheral region PFA shown in FIGS. 1 and 2, and has a function of suppressing leakage of the liquid crystal layer LQ (see FIG. 17) to outside of the display region DA. In the example shown in FIG. 17, the substrate 10 and the substrate 20 exist in the transparent region IRA. However, an opening that holes the substrate 10 (or the substrate 10 and the substrate 20) may be formed in the transparent region TRA when the sealing member SLM is arranged on the entire circumference of the frame region FRA. The hardening of the sealing member SLM by the ultraviolet ray is as described above.

In the case of the arrangement of the sealing member SLM in the frame region FRA as shown in FIG. 16, application of the sealing member SLM starts from an optional point (start point) of the frame region FRA. An application process of the sealing member SLM is continuously performed so as to draw a circle along the outer circumference of the transparent region TRA, and the process ends when the process returns to the application start point of the sealing member SLM. In the case of the above-described application method of the sealing member SLM, at a position at which the start point and the end point of the application process overlap each other, an application amount of the sealing member SLM is large. As a result, a width WSL1 of the sealing member SLM at the start point of the application process is larger than a width WSL2 of the sealing member SLM at a point that is different from the start point and the end point. If the sealing member SLM leaks to the display region DA, this leakage becomes a cause of failure in the display. If the sealing member SLM leaks to the transparent region TRA, this leakage becomes a cause of failure in the light transmittable property. Therefore, even at the start point of the application process of the sealing member SLM, it is necessary to prevent the leakage of the sealing member SLM from the frame region FRA.

In the case of the display apparatus DSP1, as shown in FIG. 4, the conductive layer CL2 is covered with the insulating film 14, and the conductive layer CL3 is formed on the insulating layer 14 and covered with the insulating film 15. As shown in FIG. 13, the frame region FRA includes the contact region CTA where the plurality of contact holes CH1 that electrically connect the conductive layer CL2 (see FIG. 15) and the conductive layer CL3 (see FIG. 15) are arranged along the X direction. And, as shown in FIG. 17, a gap between the contact region CTA and the display region DA has a step portion STP1 not having the conductive layer CL3 (see FIG. 15) and the insulating film 15 formed on the insulating film 14. The step portion STP1 has a concave shape that is formed by removing the insulating film 15. When the application amount of the sealing member SLM is locally large, the sealing member SLM flows into the step portion STP1 in some cases. However, in the step portion STP1, the separate distance between the alignment film AL1 and the alignment film AL2 is larger than that of the display region DA. Therefore, even when the sealing member SLM spreads into the step portion STP1, an end of the sealing member does not reach the display region DA. That is, by the formation of the step portion STP1, the sealing member SLM can be suppressed from leaking to the display region DA or the transparent region TRA.

The step portion STP1 is formed by removing a part of the insulating film 15. In the case of the display apparatus DSP1, the conductor pattern of the conductive layer CL3 is formed inside the frame region FRA as shown in FIG. 15, and therefore, it is necessary to form the insulating film 15 inside the frame region FRA. However, when the position of the contact region CTA is closer to the transparent region TRA as shown in FIG. 17, the step portion STP1 can be formed.

As shown in FIG. 13, in the frame region FRA, the plurality of image signal lines SL and the plurality of scan signal lines GL cross each other. In the step of forming the conductive layer CL1 and the conductive layer CL2 shown in FIG. 15, the conductive layer CL1 and the insulating film 13 are formed before the formation of the conductive layer CL2. Since the insulating film 13 is thinner than the insulating film 14 that is the inorganic insulating film, surface flatness of the insulating film 13 is lower than surface flatness of the insulating film 14. Therefore, a wiring width of the image signal line SL tends to be small at each cross point at which the plurality of image signal lines SL and the bypass wiring portions GLc of the plurality of scan signal lines GL cross each other.

Accordingly, in the case of the display apparatus DSP1, a countermeasure has been made for suppressing reduction in a signal transmission property resulted from the thin image signal line SL at the cross point with the scan signal line GL. That is, a width SLw1 of the extension wiring portion SLr of each of the plurality of image signal lines SL shown in FIG. 6 is larger than a width SLw2 of each of the plurality of bypass wiring portions SLc2. As described above, in order to reduce the area of the frame region FRA, the arrangement pitch SLp2 between the bypass wiring portions SLc2 is preferably as small as possible. By the small width SLw2 of the bypass wiring portions SLc2, the arrangement pitch SLp2 can be made small. In the example shown in FIG. 6, the width SLw2 of the bypass wiring portions SLc2 is 2.1 μm, and the arrangement pitch SLp2 is 4.5 μm. Meanwhile, the width SLw1 of the extension wiring portion SLr of each of the plurality of image signal lines SL is 2.7 μm. This manner can suppress the reduction in the signal transmission property resulted from the thin image signal line SL at the cross point with the scan signal line GL.

Note that the width SLw3 of the bypass wiring portion SLc3 shown in FIG. 7 is 3.5 µm. The conductor pattern that is formed in the conductive layer CL3 (see FIG. 15) is made of a metal having a larger resistance than that of the conductor pattern that is formed in the conductive layer CL2 (see FIG. 15). Therefore, when the width SLw3 of the bypass wiring portion SLc3 in the conductive layer CL3 is made larger than the width SLw2 shown in FIG. 6, a difference in a wiring impedance between the bypass wiring portion SLc3 and the bypass wiring portion SLc2 can be reduced. The width GLw2 of the bypass wiring portion GLc of the scan signal line GL shown in FIG. 5 is equal to the width GLw1 of the scan signal line GL in the display region DA. For example, in the example shown in FIG. 5, each of the width GLw1 and the width GLw2 is 3 µm.

As shown in FIG. 13, in order to decrease the capacitance load due to the crossing at the cross points at which the plurality of image signal lines SL and the bypass wiring portion GLc of the plurality of scan signal lines GL cross each other, an overlap area of the image signal line SL and the scan signal line GL is better to be small. In order to decrease the overlap area of the image signal line SL and the scan signal line GL, an angle of the crossing of the image signal line SL and the scan signal line GL is preferably a right angle as close as possible. In the case of the present embodiment, as shown in FIG. 13, regarding an acute angle that is formed at each of the plurality of cross points at which the plurality of image signal lines SL and the plurality of bypass wiring portions GLc cross each other in the frame region FRA, the number of acute angles $\theta 1$ that is equal to or larger than 45 degrees is larger than the number of acute angles that is smaller than 45 degrees. In the example shown in FIG. 13, note that the acute angles that are formed at the cross points at which the image signal lines SL and the bypass wiring portions GLc GL cross each other do not include the acute angle that is smaller than 45 degrees. The expression describing that "the number of acute angles $\theta 1$ that is equal to or larger than 45 degrees is larger than the number of acute angles that is smaller than 45 degrees" also includes a case without the acute angle that is smaller than 45 degrees. It is needless to say that the above-described expression also includes a case with the acute angle that is smaller than 45 degrees.

Second Embodiment

In the above-described first embodiment, the aspect of the decrease in the area of the frame region FRA shown in FIG. 6 by the formation of the bypass wiring portions of the image signal lines SL in the plurality of conductive layers has been explained. In the present second embodiment, an aspect in a case of routing the bypass wiring portion of the image signal line SL in single conductive layer will be explained. FIG. 18 is an enlarged planar view of a second conductive layer in periphery of a transparent region of a display apparatus according to a modification example of FIG. 6.

Figure 18:
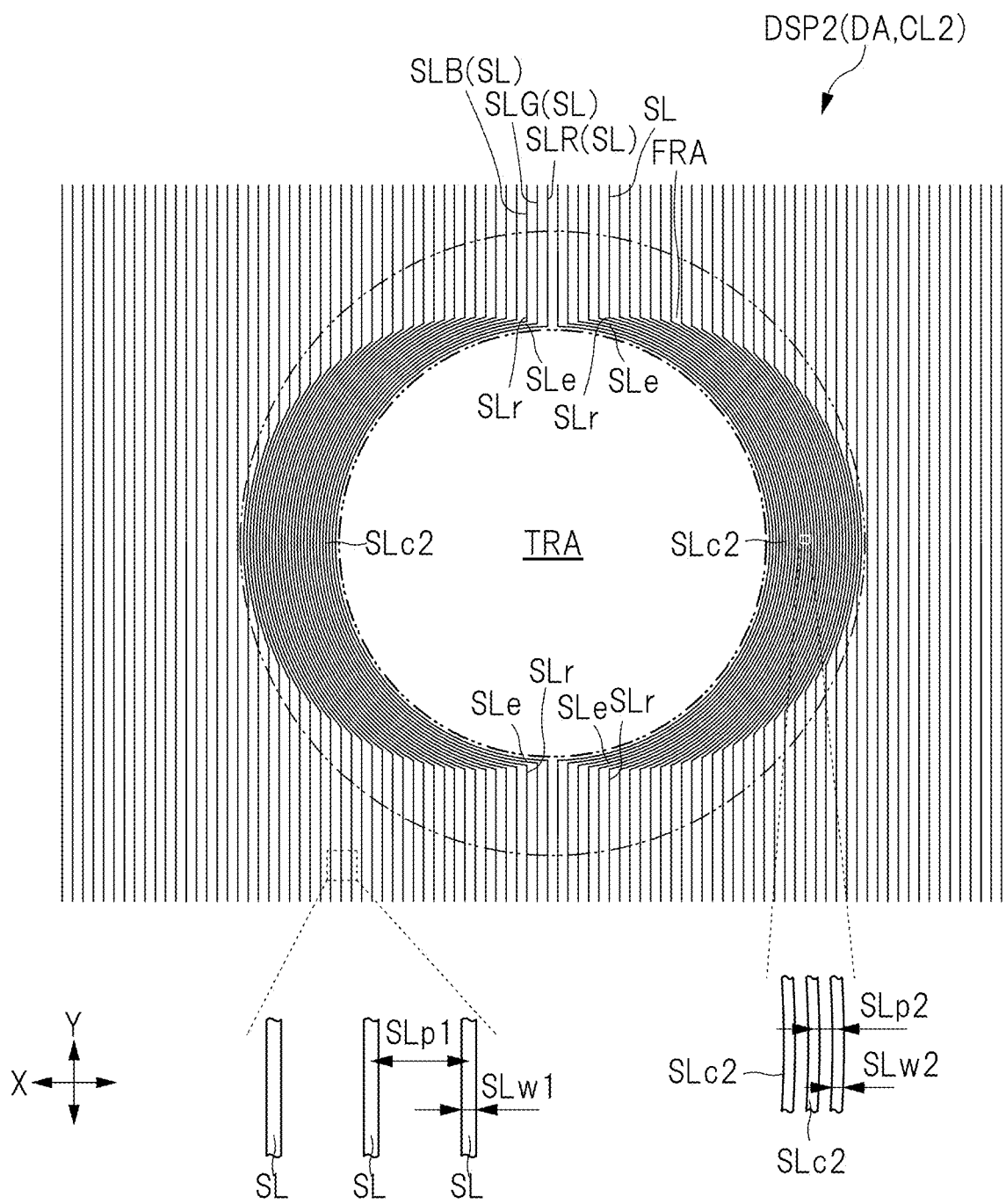
FIG. 18 is an enlarged plan view of the second conductive layer in periphery of the transparent region included in a display apparatus according to a modification example of FIG. 6.

A display apparatus DSP2 shown in FIG. 18 is different from the display apparatus DSP1 shown in FIG. 6 in that all bypass wiring portions SLc2 of the image signal lines SL are arranged in the conductive layer CL2 that is the second conductive layer while any wiring is not formed in the conductive layer CL3 shown in FIG. 7. The arrangement pitch SLp1 between the image signal lines SL in the display region DA is 18 µm as similar to the example shown in FIG. 6. The arrangement pitch SLp2 between the bypass wiring portions SLc2 in the frame region FRA is 4.5 µm as similar to the example shown in FIG. 6. In the case of the display apparatus DSP2, the arrangement pitch SLp2 between the bypass wiring portions SLc2 is smaller than the arrangement pitch SLp1 between the image signal lines SL in the display region DA, and therefore, the area of the frame region FRA can be decreased.

Figure 19:
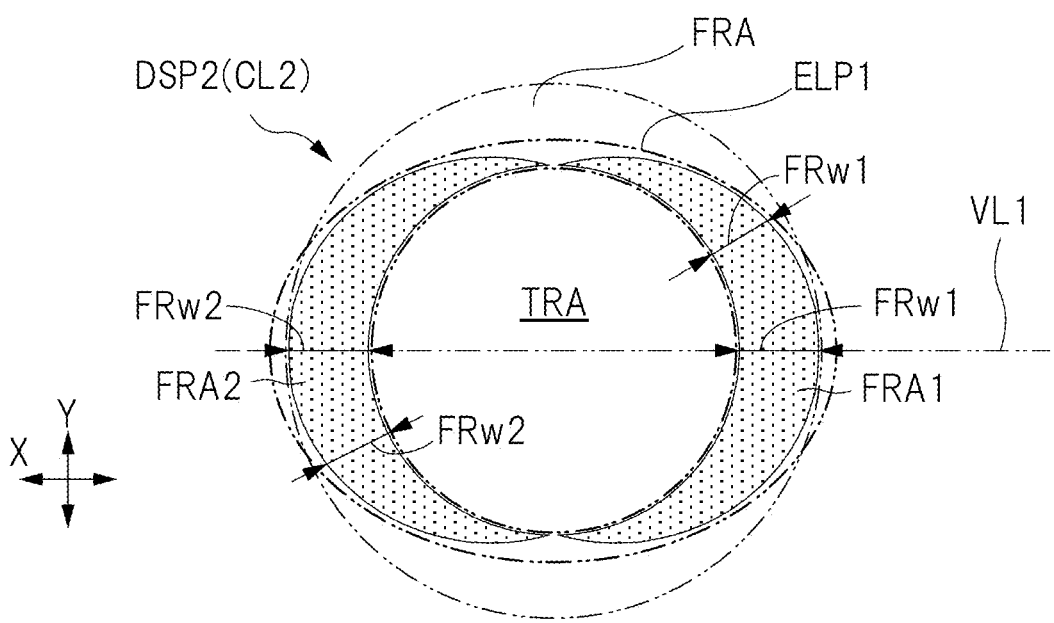
FIG. 19 is an enlarged plan view schematically showing a region where a plurality of bypass wiring portions shown in FIG. 18 are arranged.

FIG. 19 is an enlarged planar view schematically showing a region where a plurality of bypass wiring portions shown in FIG. 18 are arranged. As shown in FIG. 19, in the case of the display apparatus DSP2, the plurality of bypass wiring portions SLc2 are arranged on both sides of the transparent region TRA in the X direction. In other words, as shown in FIG. 19, the frame region FRA includes a region (first region) FRA1 which is arranged adjacent to the transparent region TRA in the X direction and where one part of each of the plurality of bypass wiring portions SLc2 (see FIG. 18) is arranged. Also, the frame region FRA includes a region (second region) FRA2 which is opposite to the region FRA1 across the transparent region TRA and where the other part of each of the plurality of bypass wiring portions SLc2 is arranged.

As shown in FIG. 19, when the bypass wiring portions SLc2 (see FIG. 18) are arranged on both sides of the transparent region TRA in the X direction, the area of the frame region FRA can be made smaller than that in the case of the arrangement of the bypass wiring portion on only either one side of the transparent region TRA in the X direction.

Each of the plurality of bypass wiring portions SLc2 (see FIG. 18) that are arranged in the region FRA1 shown in FIG. 19 extends in an arc form along the outer edge of the transparent region TRA. A planar shape of the region FRA1 is a crescent moon shape. A width FRw1 of the region FRA1 changes depending on a position in the Y direction, and is the largest at a position overlapping a first virtual line VL1 that extends in the X direction from a center of the transparent region TRA. Similarly, each of the plurality of bypass wiring portions SLc2 that are arranged in the region FRA2 extends in an arc form along the outer edge of the transparent region TRA. A planar shape of the region FRA2 is a crescent moon shape. A width FRw2 of the region FRA2 changes depending on a position in the Y direction, and is the largest at a position overlapping the first virtual line VL1 that extends in the X direction from the center of the transparent region TRA. Note that the width of each of the regions FRA1 and FRA2 is defined to be a length in a direction that is orthogonal to a tangent line to the bypass wiring portion that is arranged in the innermost circumference of each region. The farther a position from the virtual line VL1 is, the smaller the width FRw1 or FRw2 is.

Figure 20:
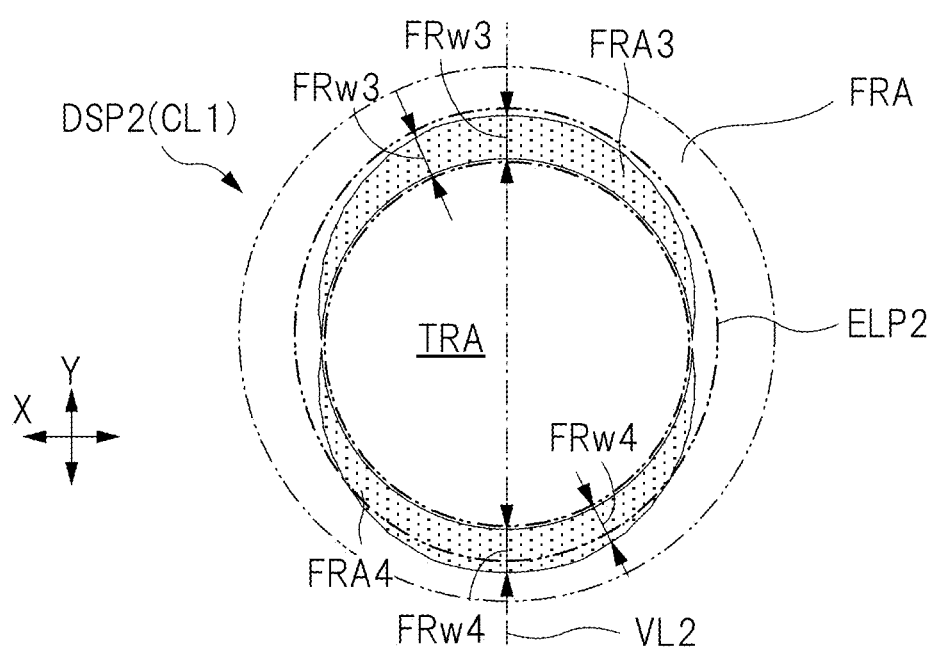
FIG. 20 is an enlarged plan view schematically showing a region where a plurality of bypass wiring portions of the first conductive layer of the display apparatus shown in FIG. 18 are arranged.

FIG. 20 is an enlarged planar view schematically showing a region where a plurality of bypass wiring portions of the first conductive layer of the display apparatus DSP2 shown in FIG. 18 are arranged. As similar to the display apparatus DSP1 shown in FIG. 9, the frame region FRA of the display apparatus DSP2 shown in FIG. 20 includes a region (third region) FRA3 which is arranged adjacent to the transparent region TRA in the Y direction and where one part of each of the plurality of bypass wiring portions GLc (see FIG. 5) is arranged. Also, the frame region FRA includes a region (fourth region) FRA4 which is opposite to the region FRA3 across the transparent region TRA and where the other part of each of the plurality of bypass wiring portions GLc is arranged.

As shown in FIG. 19, each outer edge of the region FRA1 and the region FRA2 (each circumferential portion thereof closer to the display region DA) of the frame region FRA in a planar view is arranged along a first ellipse ELP1 having two focal points in the X direction. As shown in FIG. 20, each outer edge of the region FRA3 and the region FRA4 (each circumferential portion thereof closer to the display region DA) of the frame region FRA in a planar view is arranged along a second ellipse ELP2 having two focal points in the Y direction.

As shown in FIGS. 19 and 20, the transparent region TRA in a planar view is circular. Each inner edge of the region FRA1 and the region FRA2 (each circumferential portion thereof closer to the transparent region TRA) of the frame region FRA in a planar view shown in FIG. 19 is arranged along a circle that is a concentric circle with the center of the transparent region TRA. As shown in FIG. 20, each inner edge of the region FRA3 and the region FRA4 (each circumferential portion thereof closer to the transparent region TRA) of the frame region FRA in a planar view is arranged along a circle that is a concentric circle with the center of the transparent region TRA.

FIG. 21 is an enlarged cross-sectional view showing a modification example of FIG. 12. In the case of the display apparatus DSP2, the bypass wiring portion is not arranged in the conductive layer CL3 as descried above. Therefore, the display apparatus DSP2 is different from the display apparatus DSP1 that has been explained with reference to FIG. 12 in the layout of the image signal lines SL. That is, as shown in FIG. 21, the plurality of image signal lines SL include the plurality of image signal lines SLR in which the image signal for the first color (such as red) is transmitted, the plurality of image signal lines SLB in which the image signal for the second color (such as blue) is transmitted, and the plurality of image signal lines SLG in which the image signal for the third color (such as green) is transmitted. In a planar view, one of the image signal lines SLR, one of the image signal lines SLG and one of the image signal lines SLB are arranged between the adjacent bypass wiring portions GLc.

An order of the arrangement of the image signal line SLR, the image signal line SLG and the image signal line SLB is preferably periodic. That is, in the example shown in FIG. 21, the bypass wiring portion SLc2 of the image signal line SLR is arranged between the image signal line SLG and one of the bypass wiring portions GLc, and the bypass wiring portion SLc2 of the image signal line SLB is arranged between the image signal line SLG and the other of the bypass wiring portions GLc. In this case, the capacitance loads on the respective wirings of the image signal line SLR, the image signal line SLG and the image signal line SLB can be unified. As a result, in the display in the raster mode that displays the image by setting the color density for each pixel, the display unevenness due to the difference of the capacitance load on the image signal line SL can be reduced.

The display apparatus DSP2 is the same as the display apparatus DSP1 shown in FIG. 1 except in the above-described differences. Therefore, the repetitive explanation will be omitted. However, a part of the plurality of technical features of the display apparatus DSP1 that has been explained with reference to FIGS. 1 to 17 may be applicable to the display apparatus DSP2.

It would be understood that various modification examples and alteration examples could have been anticipated within the concept of the present invention by those who are skilled in the art, and understood that these modification examples and alteration examples are also within the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the outline of the present invention.

The explanations for the above-described embodiments include the following technical concepts.

[Statement 1]

A display apparatus includes:

a first substrate having a display region, a transparent region formed inside the display region in a planar view, and a frame region formed between the display region and the transparent region so as to surround the transparent region along an outer edge of the transparent region in a planar view;

a plurality of scan signal lines formed in a first conductive layer on the first substrate in the display region so as to extend in a first direction; and a plurality of image signal lines formed in a second conductive layer on the first substrate in the display region so as to extend in a second direction crossing the first direction, some of the plurality of scan signal lines include: a plurality of first extension wirings arranged in the display region so as to extend in the first direction and a plurality of first bypass wirings arranged in the frame region so as to have both ends being connected to the plurality of first extension wirings, some of the plurality of image signal lines include: a plurality of second extension wirings arranged in the display region so as to extend in the second direction and a plurality of second bypass wirings arranged in the frame region so as to have both ends being connected to the plurality of second extension wirings, an arrangement pitch between the plurality of first bypass wirings is smaller than an arrangement pitch between the plurality of first extension wirings, an arrangement pitch between the plurality of second bypass wirings is smaller than an arrangement pitch between the plurality of second extension wirings, the frame region includes:

a first region arranged adjacent to the transparent region in the first direction and where one part of each of the plurality of second bypass wirings is arranged;

a second region which is opposite to the first region across the transparent region in the first direction and where the other part of each of the plurality of second bypass wirings is arranged;

a third region arranged adjacent to the transparent region in the second direction and where one part of each of the plurality of first bypass wirings is arranged; and a fourth region which is opposite to the third region across the transparent region in the second direction and where the other part of each of the plurality of first bypass wirings is arranged.

[Statement 2]

In the display apparatus of the Statement 1, each outer edge of the first region and the second region (each circumferential portion thereof closer to the display region) of the frame region in a planar view is arranged along a first ellipse having two focal points in the first direction, and each outer edge of the third region and the fourth region (each circumferential portion thereof closer to the display region) of the frame region in a planar view is arranged along a second ellipse having two focal points in the second direction.

[Statement 3]

In the display apparatus of the Statement 2, the transparent region in a planar view is circular, each inner edge of the first region and the second region (each circumferential portion thereof closer to the transparent region) of the frame region in a planar view is arranged along a first circle that is a concentric circle with a center of the transparent region, and each inner edge of the third region and the fourth region (each circumferential portion thereof closer to the transparent region) of the frame region in a planar view is arranged along a second circle that is a concentric circle with the center of the transparent region.

[Statement 4]

In the display apparatus of the Statement 1, the plurality of image signal lines include a plurality of first image signal lines in which an image signal for a first color is transmitted, a plurality of second image signal lines in which an image signal for a second color is transmitted, and a plurality of third image signal lines in which an image signal for a third color is transmitted, and one of the first image signal lines, one of the second image signal lines and one of the third image signal lines are arranged between the first bypass wirings that are adjacent to each other in a planar view.

INDUSTRIAL APPLICABILITY

The present invention can be utilized for a display apparatus.

EXPLANATION OF REFERENCE CHARACTERS 10, 20 . . . substrate
10f, 20f . . . front surface (plane, main surface)
20b . . . back surface (plane, main surface)
11 to 16 . . . insulating film
AL1, AL2 . . . alignment film
CH1 . . . contact hole
CHb . . . base surface
CL1, CL2, CL3, CL4, CL5 . . . conductive layer
CTA . . . contact region
DA . . . display region
DSP1, DSP2 . . . display apparatus
FRA . . . frame region
GL . . . scan signal line
GLc, SLc2, SLc3 . . . bypass wiring portion (bypass wiring)
GLr, SLr . . . extension wiring portion (extension wiring)
GLs1, SLs1 . . . separate distance
GLp1, GLp2, SLp1, SLp2, SLp3 . . . arrangement pitch
GLw1, GLw2, SLw1, SLw2, SLw3 . . . width
LQ . . . liquid crystal layer
SL, SLB, SLG, SLR . . . image signal line
SLCP . . . contact
SLM . . . sealing member (adhesive member)
STP1 . . . step portion
TRA . . . transparent region

The invention claimed is:

1. A display apparatus comprising:
a first substrate having a display region;
a transparent region formed inside the display region in a planar view;
a frame region formed between the display region and the transparent region so as to surround the transparent region along an outer edge of the transparent region in a planar view;
a plurality of scan signal lines formed in a first conductive layer on the first substrate in the display region so as to extend in a first direction; and
a plurality of image signal lines formed in a second conductive layer on the first substrate in the display region so as to extend in a second direction crossing the first direction,
wherein some of the plurality of image signal lines include: a plurality of extension wirings arranged in the display region so as to extend in the second direction; and a plurality of bypass wirings arranged in the frame region so as to have both ends being connected to the plurality of extension wirings,
the plurality of bypass wirings of the plurality of image signal lines include: a plurality of second-layer bypass wirings arranged in the second conductive layer; and a plurality of third-layer bypass wirings arranged in a third conductive layer that is different from the first conductive layer and the second conductive layer, and
each of an arrangement pitch between the plurality of second-layer bypass wirings and an arrangement pitch between the plurality of third-layer bypass wirings is smaller than an arrangement pitch between the plurality of image signal lines in the display region.

2. The display apparatus according to claim 1,
wherein the frame region includes:
a first region which is arranged adjacent to the transparent region in the first direction and where one part of each of the plurality of second-layer bypass wirings and the plurality of third-layer bypass wirings is arranged; and
a second region which is opposite to the first region across the transparent region in the first direction and where the other part of each of the plurality of second-layer bypass wirings and the plurality of third-layer bypass wirings is arranged.

3. The display apparatus according to claim 2,
wherein the number of the plurality of second-layer bypass wirings that are arranged in the first region and the number of the plurality of second-layer bypass wirings that are arranged in the second region are equal to each other, and
the number of the plurality of third-layer bypass wirings that are arranged in the first region and the number of the plurality of third-layer bypass wirings that are arranged in the second region are equal to each other.

4. The display apparatus according to claim 2,
wherein each of the plurality of second-layer bypass wirings and the plurality of third-layer bypass wirings that are arranged in the first region extends in an arc form along an outer edge of the transparent region, and
a width of the first region changes depending on a position in the second direction, and is the largest at a position overlapping a first virtual line that extends in the first direction from a center of the transparent region.

5. The display apparatus according to claim 1,
wherein some of the plurality of scan signal lines include: a plurality of scan-signal extension wirings arranged in the display region so as to extend in the first direction; and a plurality of first-layer bypass wirings arranged in the frame region of the first conductive layer so as to have both ends being connected to the plurality of scan-signal extension wirings, and an arrangement pitch between the plurality of first-layer bypass wirings is smaller than an arrangement pitch between the plurality of scan signal lines in the display region.

6. The display apparatus according to claim 5,
wherein the frame region includes:
a third region which is arranged adjacent to the transparent region in the second direction and where one part of each of the plurality of first-layer bypass wirings is arranged; and
a fourth region which is opposite to the third region across the transparent region in the second direction and where the other part of each of the plurality of first-layer bypass wirings is arranged.

7. The display apparatus according to claim 6,
wherein the number of the plurality of first-layer bypass wirings that are arranged in the third region and the number of the plurality of first-layer bypass wirings that are arranged in the fourth region are equal to each other.

8. The display apparatus according to claim 6,
wherein each of the plurality of first-layer bypass wirings that are arranged in the third region extends in an arc form along an outer edge of the transparent region, and
a width of the third region is the largest at a position overlapping a second virtual line that extends in the second direction from a center of the transparent region.

9. The display apparatus according to claim 5,
wherein the plurality of image signal lines include: a plurality of first image signal lines in which an image signal for a first color is transmitted; a plurality of second image signal lines in which an image signal for a second color is transmitted; and a plurality of third image signal lines in which an image signal for a third color is transmitted,
the plurality of first image signal lines and the plurality of second image signal lines are connected to the plurality of second-layer bypass wirings in the frame region, and
the plurality of third image signal lines are connected to the plurality of third-layer bypass wirings in the frame region.

10. The display apparatus according to claim 9,
wherein a pair of the first image signal line and the second image signal line are arranged so as to be adjacent to each other in the frame region, and the third image signal line is arranged between the pair of the first image signal line and the second image signal line in a planar view, and,
in a planar view, an arrangement pitch between the plurality of third-layer bypass wirings that are adjacent to each other is larger than an arrangement pitch between the plurality of second-layer bypass wirings that are adjacent to each other.

11. The display apparatus according to claim 9,
wherein a pair of the first image signal line and the second image signal line are arranged so as to be adjacent to each other in the frame region, and the scan signal line is arranged between the pair of the first image signal line and the second image signal line in a planar view, and,
in a planar view, an arrangement pitch between the plurality of first-layer bypass wirings that are adjacent to each other is larger than an arrangement pitch between the plurality of second-layer bypass wirings that are adjacent to each other.

12. The display apparatus according to claim 11,
wherein the plurality of first-layer bypass wirings of the scan signal lines and the plurality of third-layer bypass wirings of the third image signal lines overlap each other in a planar view, and
a gap between the pairs that are adjacent to each other in a planar view has a light-transmittable region where the plurality of first-layer bypass wirings of the scan signal lines and the plurality of third-layer bypass wirings of the third image signal lines are not arranged and which extends in an extension direction of the plurality of second-layer bypass wirings.

13. The display apparatus according to claim 6 further comprising:
a second substrate having the display region and the frame region and arranged to face the first substrate; and
a sealing member arranged in the frame region so as to surround the transparent region in a planar view and configured to adhesively bond the first substrate and the second substrate,
wherein the second conductive layer is covered with a first insulating film,
the third conductive layer is formed on the first insulating film and is covered with a second insulating film,
the frame region includes a contact region where a plurality of contact holes that electrically connect the second conductive layer and the third conductive layer are arranged along the first direction, and
a gap between the contact region and the display region has a step portion not having the third conductive layer and the second insulating film formed on the first insulating film.

14. The display apparatus according to claim 1,
wherein a plurality of contact holes that electrically connect the second conductive layer and the third conductive layer are arranged in the frame region, and
each base surface of the plurality of contact holes in a planar view is formed at a position not overlapping the plurality of scan signal lines.

15. The display apparatus according to claim 1,
wherein the plurality of image signal lines and the plurality of scan signal lines in a planar view cross each other, and
a width of an extension wiring of each of the plurality of image signal lines is larger than a width of each of the plurality of second-layer bypass wirings.

16. The display apparatus according to claim 5,
wherein the plurality of image signal lines and the plurality of scan signal lines in a planar view cross each other, and,
regarding an acute angle that is formed at each of a plurality of cross points at which the plurality of image signal lines and the plurality of first-layer bypass wirings cross each other in the frame region, the number of acute angles that is equal to or larger than 45 degrees is larger than the number of acute angles that is smaller than 45 degrees.

17. The display apparatus according to claim 5,
wherein the plurality of image signal lines include: a plurality of first image signal lines in which an image signal for a first color is transmitted; a plurality of second image signal lines in which an image signal for a second color is transmitted; and a plurality of third image signal lines in which an image signal for a third color is transmitted,
one of the first image signal lines and one of the second image signal lines are arranged between the adjacent first-layer bypass wirings in a planar view, and the plurality of third-layer bypass wirings overlap the plurality of first-layer bypass wirings, and are connected to the plurality of third image signal lines.

* * * * *